United States Patent
Ito et al.

(10) Patent No.: US 11,084,835 B2
(45) Date of Patent: Aug. 10, 2021

(54) 2,3-BISPHOSPHINOPYRAZINE DERIVATIVE, METHOD FOR PRODUCING SAME, TRANSITION METAL COMPLEX, ASYMMETRIC CATALYST, AND METHOD FOR PRODUCING ORGANIC BORON COMPOUND

(71) Applicants: Nippon Chemical Industrial Co., Ltd., Tokyo (JP); NATIONAL UNIVERSITY CORPORATION HOKKAIDO UNIVERSITY, Sapporo (JP)

(72) Inventors: Hajime Ito, Sapporo (JP); Hiroaki Iwamoto, Sapporo (JP); Tsuneo Imamoto, Tokyo (JP); Ken Tamura, Tokyo (JP); Natsuhiro Sano, Tokyo (JP)

(73) Assignees: NIPPON CHEMICAL INDUSTRIAL CO., LTD., Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 0 days.

(21) Appl. No.: 16/960,374

(22) PCT Filed: Mar. 1, 2019

(86) PCT No.: PCT/JP2019/008237
§ 371 (c)(1),
(2) Date: Jul. 7, 2020

(87) PCT Pub. No.: WO2019/172150
PCT Pub. Date: Sep. 12, 2019

(65) Prior Publication Data
US 2021/0047351 A1 Feb. 18, 2021

(30) Foreign Application Priority Data
Mar. 7, 2018 (JP) .............................. JP2018-041325

(51) Int. Cl.
| | |
|---|---|
| *C07F 19/00* | (2006.01) |
| *C07F 9/50* | (2006.01) |
| *B01J 31/16* | (2006.01) |
| *B01J 31/24* | (2006.01) |

(52) U.S. Cl.
CPC ......... *C07F 9/5022* (2013.01); *B01J 31/1616* (2013.01); *B01J 31/24* (2013.01)

(58) Field of Classification Search
None
See application file for complete search history.

(56) References Cited

U.S. PATENT DOCUMENTS

| | | |
|---|---|---|
| 2007/0021610 A1 | 1/2007 | Imamoto et al. |
| 2008/0262257 A1 | 10/2008 | Sawamura et al. |

FOREIGN PATENT DOCUMENTS

| | | |
|---|---|---|
| JP | 2000-319288 A | 11/2000 |
| JP | 2007-56007 A | 3/2007 |
| JP | 2008-260734 A | 10/2008 |

OTHER PUBLICATIONS

International Search Report dated May 21, 2019, issued in counterpart International Application No. PCT/JP2019/008237. (2 pages).
Zhang et al., "Three-Hindered Quadrant Phosphine Ligands with an Aromatic Ring Backbone for the Rhodium-Catalyzed Asymmetric Hydrogenation of Functionalized Alkenes", Journal of Organic Chemistry, (2012), vol. 77, pp. 4184-4188. Cited in Specification and ISR. (5 pages).
Ito et al., "Synthesis of Optically Active Boron-Silicon Bifunctional Cyclopropane Derivatives through Enantioselective Copper(I)-Catalyzed Reaction of Allylic Carbonates with a Diboron Derivative", Angewandte Chemie International Edition, (2008), vol. 47, pp. 7424-7427. Cited in Specification and ISR. (4 pages).
Chapoulaud et al., "Functionalization by Metalation of the Benzene Moiety of Benzodiazines. Determination of structures by Long-Range 1H—15N Correlation at Natural Abundance. Diazines XXV.", Tetrahedron, (1999), vol. 55, No. 17, pp. 5389-5404. Cited in ISR. (16 pages).

*Primary Examiner* — Yun Qian
(74) *Attorney, Agent, or Firm* — Westerman, Hattori, Daniels & Adrian, LLP

(57) ABSTRACT

Provided is a 2,3-bisphosphinopyrazine derivative represented by the following general formula (1), wherein $R^1$, $R^2$, $R^3$, and $R^4$ represent an optionally substituted straight-chain or branched alkyl group having 1 to 10 carbon atoms, an optionally substituted cycloalkyl group, an optionally substituted adamantyl group, or an optionally substituted phenyl group, $R^5$ represents an optionally substituted alkyl group having 1 to 10 carbon atoms or an optionally substituted phenyl group, each $R^5$ may be the same group or a different group, $R^6$ represents a monovalent substituent, n denotes an integer of 0 to 2.

[Formula 1]

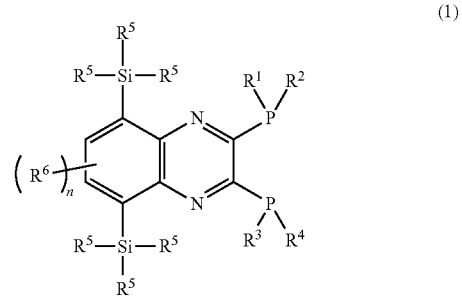

(1)

13 Claims, No Drawings

2,3-BISPHOSPHINOPYRAZINE DERIVATIVE, METHOD FOR PRODUCING SAME, TRANSITION METAL COMPLEX, ASYMMETRIC CATALYST, AND METHOD FOR PRODUCING ORGANIC BORON COMPOUND

TECHNICAL FIELD

The present invention relates to a 2,3-bisphosphinopyrazine derivative, a method for producing the same, a transition metal complex, and an asymmetric catalyst, and a method for producing an organic boron compound and a hydrogenated compound.

BACKGROUND ART

An optically active phosphine ligand having an asymmetric center on a phosphorus atom plays an important role in a catalytic asymmetric synthesis reaction using transition metal complexes. Patent Literature 1 proposes a 1,2-bis(dialkylphosphino)benzene derivative as an optically active phosphine ligand having an asymmetric center on the phosphorus atom.

Patent Literature 2 proposes a 2,3-bis(dialkylphosphino) pyrazine derivative represented by the following chemical formula (A). Since this pyrazine derivative has an extremely high electron withdrawing property derived from the pyrazine skeleton, reaction to introduce a phosphorus atom into a heterocyclic ring, which generally tends to have a low yield, can be performed very efficiently. Further, since the phosphorus atom of the pyrazine derivative has the characteristic of having a low electron density, it is effective to use a metal complex including this pyrazine derivative as a ligand as a catalyst for a reaction in which such a characteristic is utilized. However, the decrease in electron density on the phosphorus atom is slight and does not impair catalytic activity.

[Formula 1]

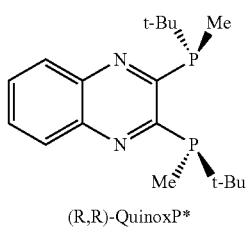

(R,R)-QuinoxP*

(A)

Non Patent Literature 1 proposes a 2,3-bis(dialkylphosphino)pyrazine derivative represented by the following chemical formula (B).

[Formula 2]

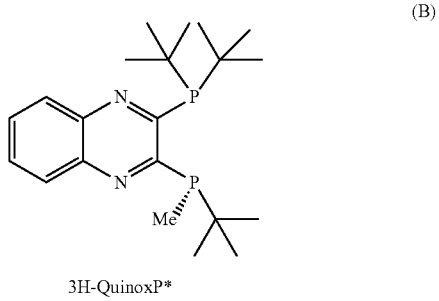

3H-QuinoxP*

(B)

Allyl boron compounds are known as useful reagents in organic synthesis because they react diastereoselectively with carbonyl compounds to give a homoallyl alcohol. Further, optically active organic boron compounds are important compounds because they are raw material for functional materials such as pharmaceuticals and liquid crystals.

It was reported that in an asymmetric boryl cyclization reaction with a (Z)-γ-silyl allyl carbonate reported in 2008, when the 2,3-bis(dialkylphosphino)pyrazine derivative of Patent Literature 2 was used as a ligand, a borated product having a trans-cyclopropane skeleton could be obtained in a high enantioselectivity (see Non Patent Literature 2). On the other hand, there have been few reported examples of cis-selective asymmetric boryl cyclization reactions using an E-form substrate, and sufficient results have not been obtained even when a 2,3-bis(dialkylphosphino) pyrazine derivative of Patent Literature 2 or Non Patent Literature 1 is used as a ligand.

Since this 2,3-bis(dialkylphosphino)pyrazine derivative is inert to oxidation in air and has a very advantageous feature as a reagent, namely, it has excellent storage stability, various performance improvements are further desired when used as an asymmetric catalyst ligand.

CITATION LIST

Patent Literature

Patent Literature 1: Japanese Patent Laid-Open No. 2000-319288
Patent Literature 2: US 2007/021610 A1

Non Patent Literature

Non Patent Literature 1: Journal of Organic Chemistry, Vol. 77, 4184-4188 (2012)
Non Patent Literature 2: Angewandte Chemie International Edition, Vol. 47, 7424-7427 (2008)

SUMMARY OF INVENTION

Therefore, it is an object of the present invention to provide a novel 2,3-bisphosphinopyrazine derivative useful as a ligand of an asymmetric catalyst, a method for producing the novel 2,3-bisphosphinopyrazine derivative, a transition metal complex including the novel 2,3-bisphosphinopyrazine derivative as a ligand, an asymmetric catalyst using this transition metal complex, and a method for producing an organic boron compound and a hydrogenated compound using the asymmetric catalyst.

The present invention provides a 2,3-bisphosphinopyrazine derivative characterized by being represented by the following general formula (1):

[Formula 3]

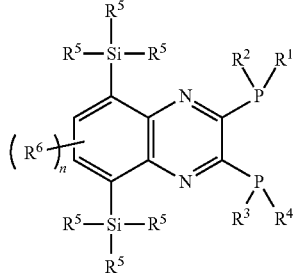

(1)

wherein $R^1$, $R^2$, $R^3$, and $R^4$ represent an optionally substituted straight-chain or branched alkyl group having 1 to 10 carbon atoms, an optionally substituted cycloalkyl group, an optionally substituted adamantyl group, or an optionally substituted phenyl group, $R^5$ represents an optionally substituted alkyl group having 1 to 10 carbon atoms, preferably 1 to 6 carbon atoms, or an optionally substituted phenyl group, each $R^5$ may be the same group or a different group, $R^6$ represents a monovalent substituent, and n denotes an integer of 0 to 2.

Further, the present invention provides an optically active form of the 2,3-bisphosphinopyrazine derivative represented by general formula (1).

In addition, the present invention provides an optically active form of the 2,3-bisphosphinopyrazine derivative represented by the following general formula (2):

[Formula 4]

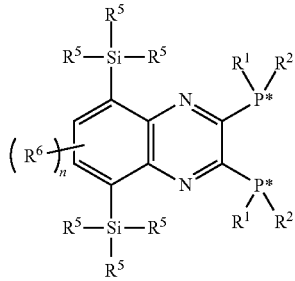

(2)

wherein $R^1$, $R^2$, $R^5$, $R^6$, and n have the same meanings as in general formula (1), $R^1$ and $R^2$ are not the same group, and * represents an asymmetric center on the phosphorus atom.

Still further, the present invention provides an optically active form of the 2,3-bisphosphinopyrazine derivative represented by the following general formula (3):

[Formula 5]

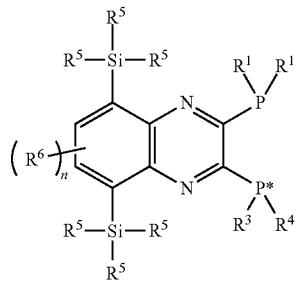

(3)

wherein $R^1$, $R^3$, $R^4$, $R^5$, $R^6$, and n have the same meaning as in general formula (1), $R^3$ and $R^4$ are not the same group, and * represents an asymmetric center on the phosphorus atom.

Further, the present invention provides a method for producing an optically active form of the 2,3-bisphosphinopyrazine derivative represented by general formula (2), comprising making a deprotonated product of an optically active phosphine-borane represented by the following general formula (5a):

[Formula 6]

(5a)

wherein $R^1$ and $R^2$ have the same meaning as in general formula (1), $R^1$ and $R^2$ are not the same group, and represents an asymmetric center on the phosphorus atom to act on an optically active 2,3-dihalogenopyrazine derivative represented by the following general formula (4):

[Formula 7]

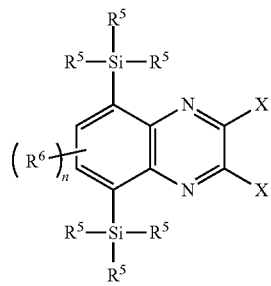

(4)

wherein $R^5$, $R^6$, and n have the same meaning as in general formula (1), and X represents a halogen atom to perform a nucleophilic substitution reaction; and then performing a deboranation reaction.

Still further, the present invention provides a method for producing an optically active form of the 2,3-bisphosphinopyrazine derivative represented by general formula (2), comprising mixing a liquid comprising a 2,3-dihalogenopyrazine derivative represented by the following general formula (4):

[Formula 8]

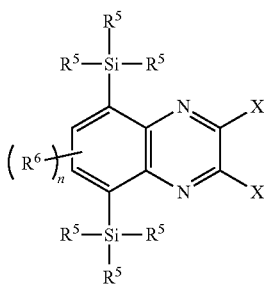

(4)

wherein $R^5$, $R^6$, and n have the same meanings as in general formula (1), and X represents a halogen atom, an optically active phosphine-borane represented by the following general formula (5a),

[Formula 9]

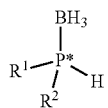

(5a)

wherein $R^1$ and $R^2$ have the same meanings as in general formula (1), $R^1$ and $R^2$ are not the same group, and * represents an asymmetric center on the phosphorus atom, and a deboranation agent with a base to perform a reaction.

In addition, the present invention provides a method for producing an optically active 2,3-bisphosphinopyrazine derivative represented by general formula (3), comprising making a deprotonated product of a phosphine-borane represented by the following general formula (5b):

[Formula 10]

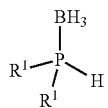

(5b)

wherein $R^1$ has the same meaning as in general formula (1) to act on an optically active 2,3-dihalogenopyrazine derivative represented by the following general formula (4):

[Formula 11]

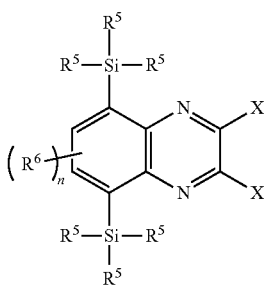

(4)

wherein $R^5$, $R^6$, and n have the same meaning as in general formula (1), and X represents a halogen atom to perform a nucleophilic substitution reaction (1);

then performing a deboranation reaction to obtain a phosphinopyrazine derivative represented by the following general formula (6):

[Formula 12]

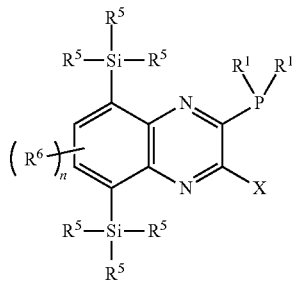

(6)

wherein $R^1$, $R^5$, $R^6$, X, and n have the same meaning as in general formula (1);

then making a deprotonated product of an optically active phosphine-borane represented by the following general formula (7),

[Formula 13]

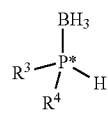

(7)

wherein $R^3$, $R^4$, and * have the same meaning as in general formula (3), and $R^3$ and $R^4$ are not the same group to act on the phosphinopyrazine derivative represented by general formula (6)

to performing a nucleophilic substitution reaction (2); and then performing a deboranation reaction (2).

Further, the present invention provides a transition metal complex comprising the 2,3-bisphosphinopyrazine derivative represented by any of general formulas (1) to (3) as a ligand.

Still further, the present invention provides an asymmetric catalyst comprising the transition metal complex.

Further, the present invention provides a method for producing, by using a copper metal complex as the asymmetric catalyst, an organic boron compound represented by the following general formula (10) or the following general formula (11),

[Formula 14]

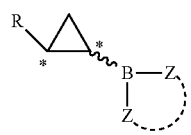

(10)

-continued

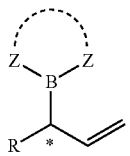
(11)

wherein R represents a hydrogen atom, an alkyl group, a substituted alkyl group, a cycloalkyl group, a substituted cycloalkyl group, an aralkyl group, a substituted aralkyl group, an aryl group, a substituted aryl group, an aliphatic heterocyclic group, a substituted aliphatic heterocyclic group, an aromatic heterocyclic group, a substituted aromatic heterocyclic group, an alkoxy group, a substituted alkoxy group, an aralkyloxy group, a substituted aralkyloxy group, an aryloxy group, a substituted aryloxy group, an alkyloxycarbonyl group, an aralkyloxycarbonyl group, a substituted silyl group or a substituted silyloxy group, an amino group, a substituted amino group, an alkylaminocarboxy group, a substituted alkylaminocarboxy group, an arylaminocarboxy group, an alkyloxycarbonyloxy group, an aryloxycarbonyloxy group, a halogen atom, a wavy line indicates that both a trans form and a cis form are possible, Z represents an atom having the same or a different lone electron pair, a dotted line connecting adjacent Z indicates that another atom is bonded to the Z, adjacent Z may form a ring via another atom, and * represents an asymmetric carbon atom to be comprising subjecting an allyl compound represented by the following general formula (8):

[Formula 15]

(8)

wherein R and the wavy line have the same meaning as in general formula 10 or 11, and E is a leaving group and represents a carbonate group, a carboxylate group, an ether group, a phosphate group or a sulfonate group to a coupling reaction with a diboron compound represented by the following general formula (9):

[Formula 16]

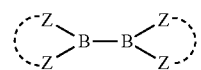
(9)

wherein Z has the same meaning as in general formula 10 or 11
in the presence of the asymmetric catalyst.

DESCRIPTION OF EMBODIMENTS

The present invention will now be described based on preferable embodiments thereof.

In the 2,3-bisphosphinopyrazine derivative of the present invention represented by general formula (1), $R^1$, $R^2$, $R^3$, and $R^4$ in the formula represent an optionally substituted straight-chain or branched alkyl group having 1 to 10 carbon atoms, an optionally substituted cycloalkyl group, an optionally substituted adamantyl group, or an optionally substituted phenyl group. Further, $R^1$ to $R^4$ may be the same group or different groups.

Examples of the straight-chain or branched alkyl group having 1 to 10 carbon atoms for $R^1$ to $R^4$ include a methyl group, an ethyl group, an isopropyl group, an n-propyl group, an isobutyl group, an n-butyl group, a sec-butyl group, a tert-butyl group, an isoheptyl group, an n-heptyl group, an isohexyl group, and an n-hexyl group. Further, the cycloalkyl group for $R^1$ to $R^4$ preferably has 3 to 10 carbon atoms, and particularly more preferably has 3 to 6 carbon atoms. Examples of such a cycloalkyl group include a cyclopentyl group and a cyclohexyl group. When any of $R^1$ to $R^4$ is a cycloalkyl group having a substituent, an adamantyl group having a substituent, or a phenyl group having a substituent, examples of the substituent include an alkyl group, a nitro group, an amino group, a hydroxyl group, an alkoxy group, a fluoro group, a chloro group, a bromo group, and an iodo group. The number of carbon atoms of the alkyl group as a substituent is preferably 1 to 10, and more preferably 1 to 6. Further, when any of $R^1$ to $R^4$ is an alkyl group having a substituent, examples of the substituent include a nitro group, an amino group, a hydroxyl group, a fluoro group, a chloro group, a bromo group, and an iodo group. When any of $R^1$ to $R^4$ is an alkyl group having a substituent, examples of the substituent include a trifluoromethyl group.

$R^5$ in the formula of general formula (1) represents an optionally substituted alkyl group having 1 to 10 carbon atoms, preferably 1 to 6 carbon atoms, or a phenyl group. The alkyl group may be in the form of a straight-chain, a branch, or a ring, but a straight-chain and branched are preferable from the viewpoint of selectivity control. Preferable examples of the alkyl group represented by $R^5$ include a methyl group, an ethyl group, an isopropyl group, and a tert-butyl group. Further, each $R^5$ may be the same group or a different group. When $R^5$ is a substituted alkyl group, examples of the substituent include those described above as examples of the substituent of the alkyl group when any of $R^1$ to $R^4$ is an alkyl group. When $R^5$ is a substituted phenyl group, examples of the substituent include those described above as examples of the substituent of the phenyl group when any of $R^1$ to $R^4$ is a phenyl group.

$R^6$ in the formula of general formula (1) represents a monovalent substituent. $R^6$ is not particularly limited as long as it is a monovalent substituent, and examples thereof include a straight-chain or branched alkyl group having 1 to 6 carbon atoms, a cycloalkyl group, a nitro group, an amino group, a hydroxyl group, an alkoxy group, a fluoro group, a chloro group, a bromo group, and an iodo group. n in the formula of general formula (1) denotes an integer of 0 to 2.

In the present invention, the 2,3-bisphosphinopyrazine derivative represented by general formula (1) is preferably an optically active form from the viewpoint of use as a ligand of an asymmetric catalyst.

As the optically active form, an optically active form of the 2,3-bisphosphinopyrazine derivative represented by the following general formula (2) or general formula (3) is preferable because such an optically active 2,3-bisphosphinopyrazine derivative generally becomes a ligand capable of constructing an effective asymmetric space due to the fact that it has a C2 symmetric structure or a three-hindered C1 symmetric structure.

[Formula 17]

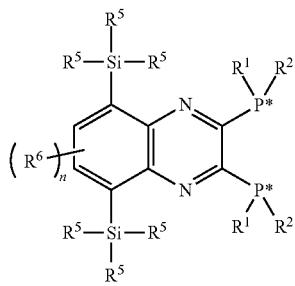

(2)

wherein $R^1$, $R^2$, $R^5$, $R^6$, and n have the same meaning as in general formula (1), $R^1$ and $R^2$ are not the same group, and * represents an asymmetric center on the phosphorus atom.

[Formula 18]

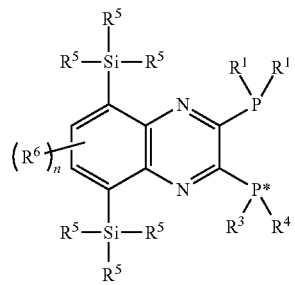

(3)

wherein $R^1$, $R^3$, $R^4$, $R^5$, $R^6$, and n have the same meaning as in general formula (1), $R^3$ and $R^4$ are not the same group, and * represents an asymmetric center on the phosphorus atom.

The compound according to the optically active form of the 2,3-bisphosphinopyrazine derivative represented by general formula (2) is a compound in which $R^1$, $R^2$, $R^5$, $R^6$, and n in the formula of general formula (2) respectively correspond to $R^1$, $R^2$, $R^5$, $R^6$, and n in the formula of the 2,3-bisphosphinopyrazine derivative of general formula (1), and in which $R^1=R^3$ and $R^2=R^4$.

The fact that $R^1$ and $R^2$ in the formula of general formula (2) are a combination of an optionally substituted branched alkyl group, an optionally substituted adamantyl group, or an optionally substituted cycloalkyl group and an optionally substituted methyl group means that a three-dimensional construct is formed. As a result, when used as a ligand of an asymmetric catalyst, an effective asymmetric space can be constructed, which is preferable. It is particularly preferable that $R^1$ and $R^2$ are a combination of the groups of any of the following (i) to (v). Each of the groups in (i) to (v) may be substituted or unsubstituted.
(i) $R^1$ and $R^2$ are a combination of a tert-butyl group and a methyl group.
(ii) $R^1$ and $R^2$ are a combination of an adamantyl group and a methyl group.
(iii) $R^1$ and $R^2$ are a combination of a 1,1,3,3-tetramethylbutyl group and a methyl group.
(iv) $R^1$ and $R^2$ are a combination of an isopropyl group and a methyl group.
(v) $R^1$ and $R^2$ are a combination of a 1-methylcyclohexyl group and a methyl group.

In the present invention, for the reason described above, it is particularly preferable that $R^1$ and $R^2$ in the formula of general formula (2) are a combination of (i) to (iii).

The compound according to the optically active form of the 2,3-bisphosphinopyrazine derivative represented by general formula (3) is a compound in which $R^1$, $R^3$, $R^4$, $R^5$, $R^6$, and n in the formula of general formula (3) respectively correspond to $R^1$, $R^3$, $R^4$, $R^5$, $R^6$, and n in the formula of the 2,3-bisphosphinopyrazine derivative of general formula (1), and in which $R^1=R^2$.

Further, it is preferable that for $R^1$, $R^3$ and $R^4$ in the formula of general formula (3), $R^1$ and one of $R^3$ and $R^4$ are an optionally substituted branched alkyl group or an optionally substituted adamantyl group and the other of $R^3$ and $R^4$ is an optionally substituted methyl group means that a three-dimensional construct is formed. As a result, when used as a ligand of an asymmetric catalyst, an effective asymmetric space can be constructed, which is preferable. It is particularly preferable that $R^1$, $R^3$, and $R^4$ are a combination of the groups of any of the following (1) to (12).
(1) $R^1$ is a tert-butyl group, and $R^3$ and $R^4$ are a combination of a tert-butyl group and a methyl group.
(2) $R^1$ is a tert-butyl group, and $R^3$ and $R^4$ are a combination of a 1,1,3,3-tetramethylbutyl group (sometimes also generally referred to as a "tert-octyl group") and a methyl group.
(3) $R^1$ is a tert-butyl group, and $R^3$ and $R^4$ are a combination of an adamantyl group and a methyl group.
(4) $R^1$ is a tert-butyl group, and $R^3$ and $R^4$ are a combination of an isopropyl group and a methyl group.
(5) $R^1$ is an adamantyl group, and $R^3$ and $R^4$ are a combination of a tert-butyl group and a methyl group.
(6) $R^1$ is an adamantyl group, and $R^3$ and $R^4$ are a combination of a 1,1,3,3-tetramethylbutyl group and a methyl group.
(7) $R^1$ is an adamantyl group, and $R^3$ and $R^4$ are a combination of an adamantyl group and a methyl group.
(8) $R^1$ is an adamantyl group, and $R^3$ and $R^4$ are a combination of an isopropyl group and a methyl group.
(9) $R^1$ is a 1,1,3,3-tetramethylbutyl group, and $R^3$ and $R^4$ are a combination of a tert-butyl group and a methyl group.
(10) $R^1$ is a 1,1,3,3-tetramethylbutyl group, and $R^3$ and $R^4$ are a combination of a 1,1,3,3-tetramethylbutyl group and a methyl group.
(11) $R^1$ is a 1,1,3,3-tetramethylbutyl group, and $R^3$ and $R^4$ are a combination of a 1,1,3,3-tetramethylbutyl group and a methyl group.
(12) $R^1$ is a 1,1,3,3-tetramethylbutyl group, and $R^3$ and $R^4$ are a combination of an isopropyl group and a methyl group.

In the present invention, for the reason described above, it is particularly preferable that $R^1$, $R^3$, and $R^4$ in the formula of general formula (3) are particularly a combination of (1) to (9).

Hereinafter, as an example of the method for producing the 2,3-bisphosphinopyrazine derivative represented by general formula (1) according to the present invention, preferable methods for producing the optically active form represented by general formulas (2) and (3) will each be described. Derivatives that are represented by general formula (1) but do not correspond to formula (2) or (3) can also be produced by the same method.

An optically active form of the 2,3-bisphosphinopyrazine derivative represented by general formula (2) can be produced by carrying out a nucleophilic substitution reaction in which a deprotonated product obtained by deprotonating the optically active phosphine-borane represented by general formula (5a) is made to act on a 2,3-dihalogenopyrazine derivative represented by general formula (4), and then carrying out a deboranation reaction.

That is, the method for producing an optically active form of the 2,3-bisphosphinopyrazine derivative represented by general formula (2) according to the present invention includes the following two steps.

(A1) Step A1 of carrying out a nucleophilic substitution reaction.

(A2) Step A2 of carrying out a deboranation reaction.

Step A1 is a step in which a nucleophilic substitution reaction is carried out by making a deprotonated product obtained by deprotonating the optically active phosphine-borane represented by general formula (5a) to act on the 2,3-dihalogenopyrazine derivative represented by general formula (4), to thereby obtain the optically active phosphinopyrazine-borane derivative represented by general formula (12).

[Formula 19]

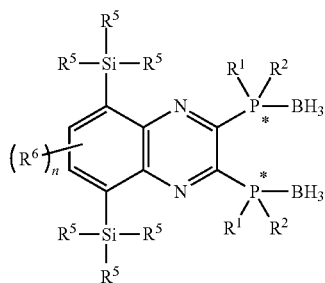

(12)

wherein $R^1$, $R^2$, $R^5$, $R^6$, and n have the same meanings as in general formula (1).

In step A1, in order to perform the nucleophilic substitution reaction, first, a liquid including the 2,3-dihalogenopyrazine derivative represented by general formula (4) (hereinafter, referred to as "liquid A") is prepared, and separately from the liquid A, a liquid in which the optically active phosphine-borane represented by general formula (5a) is deprotonated (hereinafter, referred to as "liquid B") is prepared.

The 2,3-dihalogenopyrazine derivative of the liquid A is represented by the following general formula (4).

[Formula 20]

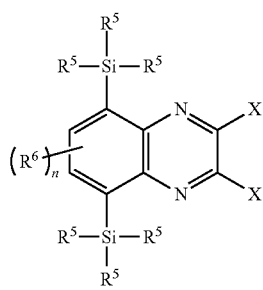

(4)

wherein $R^5$, $R^6$, and n have the same meaning as in general formula (1), and X represents a halogen atom.

X in the formula of general formula (4) is a halogen atom, and examples thereof include a chlorine atom, a bromine atom, and an iodine atom. Of these, X is preferably a chlorine atom. Further, $R^5$, $R^6$, and n in the formula of general formula (4) respectively correspond to $R^5$, $R^6$, and n in the formula of the optically active form of the 2,3-bisphosphinopyrazine derivative of general formula (2). $R^5$ represents an optionally substituted alkyl group having 1 to 10 carbon atoms, preferably 1 to 6 carbon atoms, or a phenyl group. Each $R^5$ may be the same group or a different group. $R^6$ represents a monovalent substituent, and n denotes an integer of 0 to 2.

The 2,3-dihalogenopyrazine derivative represented by general formula (4) can be produced by, for example, lithiating positions 5 and 8 of the quinoxaline skeleton of compound (13) in accordance with the following reaction scheme, and then reacting the lithiated compound with a silylating agent (19) (for example, see Chem. Eur. J. 2015, 21, 1102).

Reaction Scheme (1)

[Formula 21]

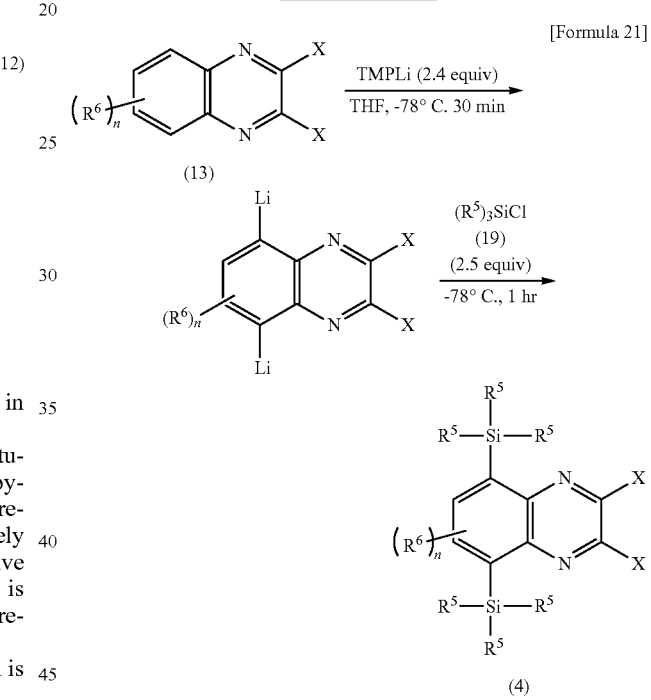

wherein X, $R^5$, $R^6$, and n have the same meaning as in general formula (1).

The liquid A may be a solution or a slurry. The solvent that can be used in the liquid A is preferably, for example, a solvent that can dissolve the 2,3-dihalogenopyrazine derivative represented by general formula (4) and that is inert to the 2,3-dihalogenopyrazine derivative represented by general formula (4). Examples of the solvent include tetrahydrofuran (THF), N,N-dimethylformamide, diethyl ether, dimethoxyethane, cyclopentyl methyl ether, tert-butyl methyl ether, dioxane, hexane, and toluene. These solvents can be used singly or as a mixed solvent. Further, it is not necessary to completely dissolve the 2,3-dihalogenopyrazine derivative represented by general formula (4), and the reaction can be started even in a slurry state.

The concentration of the 2,3-dihalogenopyrazine derivative represented by general formula (4) in the liquid A is, from the viewpoints of productivity and controlling side reactions, preferably 0.1 to 80% by mass, and particularly preferably 1 to 30% by mass.

The liquid B is a solution including an optically active phosphine-borane compound obtained by deprotonating the optically active phosphine-borane represented by general formula (5a).

The optically active phosphine-borane of the liquid B is represented by the following general formula (5a).

[Formula 22]

(5a)

wherein $R^1$ and $R^2$ have the same meaning as in general formula (1), $R^1$ and $R^2$ are not the same group, and represents an asymmetric center on the phosphorus atom.

$R^1$ and $R^2$ in the formula of general formula (5a) respectively correspond to $R^1$ and $R^2$ in the formula of the optically active form of the 2,3-bisphosphinopyrazine derivative of general formula (2). $R^1$ and $R^2$ represent an optionally substituted straight-chain or branched alkyl group having 1 to 10 carbon atoms, an optionally substituted cycloalkyl group, an optionally substituted adamantyl group, or an optionally substituted phenyl group.

The optically active phosphine-borane represented by general formula (5a) can be produced by a known method. Examples of the method for producing the optically active phosphine-borane represented by general formula (5a) include the methods described in Japanese Patent Laid-Open No. 2001-253889, Japanese Patent Laid-Open No. 2003-300988, Japanese Patent Laid-Open No. 2007-70310, Japanese Patent Laid-Open No. 2010-138136, and J. Org. Chem, 2000, vol. 65, P4185-4188.

Examples of the method for preparing the liquid B include a method of mixing a solution in which the optically active phosphine-borane represented by general formula (5a) is dissolved in a solvent with a base. This mixing enables the optically active phosphine-borane represented by general formula (5a) to be deprotonated. A preferable example of the specific mixing method includes adding the base to a liquid including the optically active phosphine-borane represented by general formula (5a).

The solvent used for dissolving the optically active phosphine-borane represented by general formula (5a) is not particularly limited, as long as the solvent is inert to the optically active phosphine-borane represented by general formula (5a) and to the optically active phosphine compound that is produced from the phosphine-borane by deprotonation. Examples of the solvent include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

In the preparation of the liquid B, the concentration of the optically active phosphine-borane represented by general formula (5a) in the solvent is, from the viewpoint of improving reactivity and productivity, preferably 1 to 80% by mass, and particularly preferably 5 to 30% by mass.

In the preparation of the liquid B, examples of the base used for deprotonation include n-butyllithium, lithium diisopropylamide, methylmagnesium bromide, potassium t-butoxide, Hunig's base, potassium hydroxide, and sodium hydroxide, and n-butyllithium is preferable.

The amount of the base used is, from the viewpoints of economic efficiency and reactivity and the viewpoint of controlling side reactions, in terms of the molar ratio of the base to the optically active phosphine-borane represented by general formula (5a), preferably 1.0 to 2.0, and more preferably 1.0 to 1.5.

The temperature of the base during the mixing with the optically active phosphine-borane represented by general formula (5a) is set to, from the viewpoints of economic efficiency and maintaining chiral purity, preferably −80 to 50° C., and more preferably to −20 to 20° C.

By mixing a liquid including the optically active phosphine-borane represented by general formula (5a) and a base, the deprotonation of the optically active phosphine-borane represented by general formula (5a) is rapidly carried out. However, an aging reaction can optionally be carried out subsequently to the completion of the mixing with the base in order to complete the deprotonation reaction. Further, it is not necessary for the deprotonation reaction to be carried out to completion. When the 2,3-dihalogenopyrazine derivative represented by general formula (4) does not react or reacts extremely slowly with the base for the deprotonation reaction, the optically active phosphinopyrazine-borane derivative represented by general formula (12) can be obtained also in the form of a so-called equilibrium reaction in which the deprotonation reaction is occurring simultaneously with the deprotonated optically active phosphine-borane reacting with the 2,3-dihalogenopyrazine derivative.

In the reaction in step A1, mixing the liquid A and the liquid B enables the nucleophilic substitution reaction to be carried out to obtain the optically active phosphinopyrazine-borane derivative represented by general formula (12). The method of mixing the liquid A and the liquid B may be a method of adding the liquid A to the liquid B, or a method of adding the liquid B to the liquid A.

From the viewpoints of reactivity and economic efficiency, it is preferable to mix the liquid A and the liquid B such that the molar ratio of the phosphine compound deprotonated from the optically active phosphine-borane represented by general formula (5a) to the 2,3-dihalogenopyrazine derivative represented by general formula (4) in the liquid A is 2.0 to 4.0, and particularly 2.0 to 3.0.

In addition, when the liquid A or the liquid B is added to the other and mixed together, from the viewpoint of obtaining a product having stable quality, it is preferable to add the liquid A or the liquid B at a constant rate.

When the liquid A or the liquid B is added to the other and mixed together, from the viewpoint of obtaining a product having a high optical purity in a high yield, the addition temperature of the liquid A or the liquid B is preferably −80 to 50° C., and more preferably −80 to 20° C.

After the liquid A and the liquid B have been mixed, an aging reaction for completing the nucleophilic substitution reaction can then optionally be carried out. The reaction temperature in the case of carrying out this aging reaction is, from the viewpoint of efficiently promoting the reaction in a high optical purity state, preferably −80 to 50° C., and particularly preferably −20 to 30° C.

Step A2 is a step in which a reaction solution including the optically active phosphinopyrazine-borane derivative represented by general formula (12) obtained in step A1 is mixed with a deboranation agent, and the optically active phosphinopyrazine-borane derivative represented by general formula (12) is subjected to a deboranation reaction to obtain an optically active form of the 2,3-bisphosphinopyrazine derivative represented by general formula (2). A preferable example of this mixing method is a method in which the deboranation agent is added to the reaction solution including the phosphinopyrazine-borane derivative.

Examples of the deboranation agent include N,N,N',N'-tetramethylethylenediamine (TMEDA), triethylenediamine (DABCO), triethylamine, HBF$_4$, and trifluoromethanesulfonic acid, and TMEDA is preferable. The amount of the deboranation agent added is generally, preferably 2 to 20 equivalents, and more preferably 3 to 10 equivalents with respect to the amount of the optically active phosphinopyrazine-borane derivative represented by general formula (12).

The reaction temperature of the deboranation reaction is preferably −20 to 80° C., and more preferably 10 to 50° C. The reaction time of deboranation is preferably 10 minutes or more, and more preferably 1 to 10 hours.

The optically active form of the 2,3-bisphosphinopyrazine derivative represented by general formula (2) formed by the deboranation reaction may optionally be purified by subjecting it to, for example, separation and washing, extraction, crystallization, distillation, sublimation, and column chromatography.

The optically active form of the 2,3-bisphosphinopyrazine derivative represented by general formula (2) can also be produced by, as another method other than that described above, mixing and reacting a liquid including the 2,3-dihalogenopyrazine derivative represented by general formula (4), the optically active phosphine-borane represented by general formula (5a), and a deboranation agent (hereinafter, sometimes referred to as "liquid a") with a base.

As the 2,3-dihalogenopyrazine derivative represented by general formula (4) and the optically active phosphine-borane represented by general formula (5a), those described in step A1 can be used.

The content of the 2,3-dihalogenopyrazine derivative represented by general formula (4) in the liquid a is, based on the total amount of the liquid a, 1 to 50% by mass, and particularly 5 to 20% by mass. It is preferable that the content of the 2,3-dihalogenopyrazine derivative represented by general formula (4) in the liquid a is within the above range because a product having a high reaction rate, excellent productivity, and excellent quality can be obtained.

The content of the optically active phosphine-borane represented by general formula (5a) in the liquid a is, from the viewpoint of higher economic efficiency and higher reactivity, preferably 2.0 to 4.0 moles, and particularly preferably 2.1 to 3.0 moles based on one mole of the 2,3-dihalogenopyrazine derivative represented by general formula (4).

Examples of the deboranation agent used in the liquid a include N,N,N',N'-tetramethylethylenediamine (TMEDA), triethylenediamine (DABCO), triethylamine, HBF$_4$, and trifluoromethanesulfonic acid. The content of the deboranation agent in the liquid a is, from the viewpoint of higher economic efficiency and higher reactivity, preferably 2 to 20 moles, and particularly preferably 2 to 10 moles based on one mole of the optically active phosphine-borane represented by general formula (5a).

The liquid a is a solution in which the 2,3-dihalogenopyrazine derivative represented by general formula (4), the optically active phosphine-borane represented by general formula (5a), and the deboranation agent are dissolved or dispersed in a solvent.

The solvent used for the liquid a is not particularly limited, as long as the solvent can dissolve or disperse the 2,3-dihalogenopyrazine derivative represented by general formula (4) and is inert to the 2,3-dihalogenopyrazine derivative represented by general formula (4). Examples of the solvent used for the liquid a include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent. In liquid a, the 2,3-dihalogenopyrazine derivative represented by general formula (4), the optically active phosphine-borane represented by general formula (5a), and the deboranation agent may be in a completely dissolved state in the solvent, or a part of all of the 2,3-dihalogenopyrazine derivative represented by general formula (4), the optically active phosphine-borane represented by general formula (5a), and the deboranation agent may not be dissolved in the solvent and may be in the form of a dispersed slurry.

Examples of the base to be mixed with the liquid a include n-butyllithium, lithium diisopropylamide, methylmagnesium bromide, potassium-tert-butoxide, sodium-tert-butoxide, Hunig's base, potassium hydroxide, and sodium hydroxide. Among these, potassium-tert-butoxide is preferable in that a product having excellent reaction yield and excellent quality can be obtained.

The reaction is then carried out by mixing the liquid a and the base to obtain an optically active form of the 2,3-bisphosphinopyrazine derivative represented by general formula (2).

As the method for mixing the liquid a and the base, a method in which the base is added to the liquid a is preferable. In the case of adding the base to the liquid a, a solution in which the base is dissolved (hereinafter, sometimes referred to as "liquid b") may be added to the liquid a, or the base may be added as a solid to the liquid a. In the present production method, it is preferable to add the liquid b to the liquid a because it is easy to control the reaction and it is easy to obtain a product having a stable quality.

The content of the base in the liquid b is not particularly limited, but from the viewpoint of high reactivity and productivity, is preferably 1 to 50% by mass, and particularly preferably 5 to 30% by mass based on the total amount of the liquid b.

The solvent used for the liquid b is not particularly limited as long as it can dissolve the base and is an inert solvent. Examples of the solvent used for the liquid b include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

The amount of the base used for the mixing with the liquid a is, from the viewpoint of higher economic efficiency and higher reactivity, preferably 1.0 to 1.5 moles, and particularly preferably 1.0 to 1.2 moles based on one mole of the optically active phosphine-borane represented by general formula (5a) in the liquid a.

Further, in the case of adding a liquid base b in which a solid base is dissolved to the liquid a or adding a liquid base directly to the liquid a, the addition rate of the base to the liquid a is not particularly limited as long as it is within a range where side reactions do not occur, and the heat of reaction can be controlled. However, from the viewpoint of obtaining a product having a stable quality, the addition rate of the base to the liquid a is preferably a constant rate. In the case of adding a solid base directly to the liquid a, it is desirable to add the solid base in portions while observing the heat of reaction.

The temperature of the liquid a (the temperature of the reaction solution) when adding the base to the liquid a may be in the range of −25 to 100° C. From the viewpoint of being industrially advantageous, the temperature of the liquid a (the temperature of the reaction solution) when adding the base to the liquid a is preferably −25 to 50° C., and more preferably −25 to 20° C.

In the present production method, after mixing the liquid a and the base, aging can optionally be carried out to complete the reaction. The aging temperature (temperature of the reaction solution) in the case of carrying out aging may be in the range of −25 to 100° C. From the viewpoint of being industrially advantageous, the aging temperature (temperature of the reaction solution) in the case of carrying out aging is preferably −25 to 80° C., and more preferably −25 to 30° C.

After the reaction is finished, the optically active form of the 2,3-bisphosphinopyrazine derivative represented by general formula (2) may optionally be purified by subjecting it to, for example, separation washing, extraction, crystallization, distillation, sublimation, and column chromatography.

Next, a preferable method for producing the optically active form of the 2,3-bisphosphinopyrazine derivative represented by general formula (3) according to the present invention will be described.

In the method for producing the optically active form of the 2,3-bisphosphinopyrazine derivative represented by general formula (3) according to the present invention, a nucleophilic substitution reaction (1) is carried out by making a deprotonated product obtained by deprotonating the phosphine-borane represented by general formula (5b) to act on the 2,3-dihalogenopyrazine derivative represented by general formula (4), then a deboranation reaction (1) is carried out to obtain the phosphinopyrazine derivative represented by general formula (6), then a nucleophilic substitution reaction (2) is carried out by making a deprotonated product of an optically active phosphine-borane represented by general formula (7) to act on the phosphinopyrazine derivative represented by general formula (6), and then a deboranation reaction (2) is carried out.

Namely, the method for producing the optically active form of the 2,3-bisphosphinopyrazine derivative represented by general formula (3) according to the present invention includes the following four steps.

(B1) Step B1 of carrying out a nucleophilic substitution reaction (1).
(B2) Step B2 of carrying out a deboranation reaction (1).
(B3) Step B3 of carrying out a nucleophilic substitution reaction (2).
(B4) Step B4 of carrying out a deboranation reaction (2).

Step B1 is a step in which a nucleophilic substitution reaction (1) is carried out by making a deprotonated product obtained by deprotonating the phosphine-borane represented by general formula (5b) to act on the 2,3-dihalogenopyrazine derivative represented by general formula (4) to obtain a phosphinopyrazine-borane derivative represented by the following general formula (14).

[Formula 23]

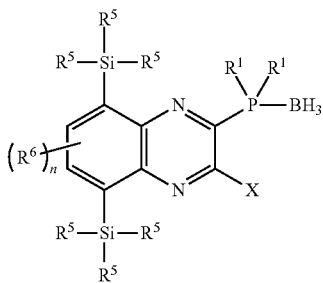

(14)

wherein $R^1$, $R^5$, $R^6$, X, and n have the same meaning as in general formula (1).

In step B1, in order to carry out the nucleophilic substitution reaction (1), first, a liquid including the 2,3-dihalogenopyrazine derivative represented by general formula (4) (hereinafter, referred to as "liquid C") is prepared, and separately from the liquid C, a liquid in which the phosphine-borane represented by general formula (5b) is deprotonated (hereinafter, referred to as "liquid D") is prepared.

As the 2,3-dihalogenopyrazine derivative of the liquid C, the same 2,3-dihalogenopyrazine derivative as that in step A1 described above represented by general formula (4) can be used.

The liquid C may be a solution or a slurry. The solvent that can be used in the liquid C is preferably, for example, a solvent that can dissolve the 2,3-dihalogenopyrazine derivative represented by general formula (4) and that is inert to the 2,3-dihalogenopyrazine derivative represented by general formula (4). Examples of the solvent include tetrahydrofuran (THF), N,N-dimethylformamide, diethyl ether, dimethoxyethane, cyclopentyl methyl ether, tert-butyl methyl ether, dioxane, hexane, and toluene. These solvents can be used singly or as a mixed solvent. Further, it is not necessary to completely dissolve the 2,3-dihalogenopyrazine derivative represented by general formula (4), and the reaction can be started even in a slurry state.

The concentration of the 2,3-dihalogenopyrazine derivative represented by general formula (4) in the liquid C is, from the viewpoints of productivity and controlling side reactions, preferably 0.1 to 80% by mass, and particularly preferably 1 to 50% by mass.

The liquid D is a solution including a phosphine-borane compound obtained by deprotonating the phosphine-borane represented by general formula (5b).

The phosphine-borane of the liquid D is represented by the following general formula (5b).

[Formula 24]

(5b)

wherein $R^1$ has the same meaning as in general formula (1).

$R^1$ in the formula of general formula (5b) corresponds to $R^1$ in the formula of the optically active form of the 2,3-bisphosphinopyrazine derivative of general formula (3). $R^1$ represents an optionally substituted straight-chain or branched alkyl group having 1 to 10 carbon atoms, an optionally substituted cycloalkyl group, an optionally substituted adamantyl group, or an optionally substituted phenyl group.

The phosphine-borane represented by general formula (5b) can be produced by a known method. Examples of the method for producing the phosphine-borane represented by general formula (5b) include the methods described in Japanese Patent Laid-Open No. 2001-253889, Japanese Patent Laid-Open No. 2003-300988, Japanese Patent Laid-Open No. 2007-70310, Japanese Patent Laid-Open No. 2010-138136, J. Org. Chem, 2000, vol. 65, P4185-4188, and the like.

Examples of the method for preparing the liquid D include a method of mixing a liquid in which the phosphine-borane represented by general formula (5b) is dissolved in a solvent with a base. This mixing enables the phosphine-borane represented by general formula (5b) to be deprotonated. A preferable example of the mixing method includes adding the base to a liquid in which the phosphine-borane represented by general formula (5b) is dissolved in a solvent.

The solvent used for dissolving the phosphine-borane represented by general formula (5b) is not particularly limited, as long as the solvent is inert to the phosphine-borane represented by general formula (5b) and to the phosphine compound that is produced from the phosphine-borane by deprotonation. Examples of the solvent include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

In the preparation of the liquid D, the concentration of the phosphine-borane represented by general formula (5b) in the solvent is, from the viewpoints of reactivity and productivity, preferably 1 to 80% by mass, and more preferably 5 to 30% by mass.

In the preparation of the liquid D, examples of the base used for deprotonation include n-butyllithium, lithium diisopropylamide, methylmagnesium bromide, potassium t-butoxide, Hunig's base, potassium hydroxide, and sodium hydroxide, and n-butyllithium is preferable.

The amount of the base used is, from the viewpoints of economic efficiency and reactivity and the viewpoint of controlling side reactions, in terms of the molar ratio of the base to the phosphine-borane represented by general formula (5b), preferably 1.0 to 2.0, and more preferably 1.0 to 1.5.

The temperature of the base during the mixing with the liquid including the phosphine-borane represented by general formula (5b) is set to, from the viewpoints of economic efficiency and controlling side reactions, preferably −80 to 50° C., and more preferably to −20 to 20° C.

By mixing a liquid including the phosphine-borane represented by general formula (5b) and a base, the deprotonation of the phosphine-borane represented by general formula (5b) is rapidly carried out. However, an aging reaction can optionally be carried out subsequently to the completion of the mixing with the base in order to complete the deprotonation reaction. Further, it is not necessary for the deprotonation reaction to be carried out to completion. When the 2,3-dihalogenopyrazine derivative represented by general formula (4) does not react or reacts extremely slowly with the base for the deprotonation reaction, the phosphinopyrazine-borane derivative represented by general formula (14) can be obtained also in the form of a so-called equilibrium reaction in which the deprotonation reaction is occurring simultaneously with the deprotonated phosphine-borane reacting with the 2,3-dihalogenopyrazine derivative.

In the reaction in step B1, mixing the liquid C and the liquid D enables the nucleophilic substitution reaction (1) to be carried out to obtain the phosphinopyrazine-borane derivative represented by general formula (14). The method of mixing the liquid C and the liquid D may be a method of adding the liquid C to the liquid D, or a method of adding the liquid D to the liquid C.

From the viewpoint of allowing the reaction to proceed efficiently, it is preferable to carry out the mixing of the liquid C and the liquid D such that the molar ratio of the phosphine compound deprotonated from the phosphine-borane represented by general formula (5b) to the 2,3-dihalogenopyrazine derivative represented by general formula (4) in the liquid C is 1.0 to 2.0, and more preferably 1.0 to 1.5.

In addition, when the liquid C or the liquid D is added to the other and the two liquids are mixed together, from the viewpoint of obtaining a product having a stable quality, it is preferable to add the liquid C or the liquid D at a constant rate.

When the liquid C or the liquid D is added to the other and the two liquids are mixed together, from the viewpoint of obtaining the target product in a high yield while controlling side reactions, the addition temperature of the liquid C or the liquid D is preferably −80 to 50° C., and more preferably −80 to 20° C.

After the liquid C and the liquid D have been mixed, an aging reaction for completing the nucleophilic substitution reaction (1) can then optionally be carried out. The reaction temperature in the case of carrying out this aging reaction is, from the viewpoint of having an efficient reaction and controlling side reactions, preferably −80 to 50° C., and more preferably −20 to 50° C.

After the nucleophilic substitution reaction (1) is finished, purification by a conventional method such as separation and washing, extraction, distillation, and desolvation can optionally be carried out to preferably remove the solvent and obtain the phosphinopyrazine-borane derivative represented by general formula (14).

Step B2 is a step in which the phosphinopyrazine derivative represented by the following general formula (6) is obtained by subjecting the phosphinopyrazine-borane derivative represented by general formula (14) obtained in step B1 to a deboranation reaction (1) in a solvent by a deboranation agent.

[Formula 25]

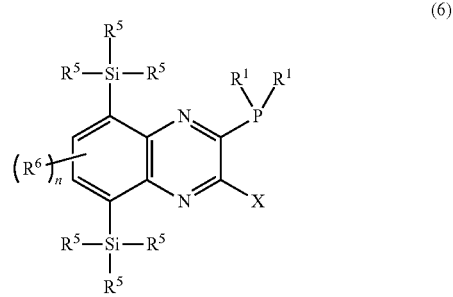

(6)

wherein $R^1$, $R^5$, $R^6$, X, and n have the same meaning as in general formula (1).

Examples of the deboranation agent used in step B2 include N,N,N',N'-tetramethylethylenediamine (TMEDA), triethylenediamine (DABCO), triethylamine, $HBF_4$, and trifluoromethanesulfonic acid, and TMEDA is preferable. The amount of the deboranation agent added is generally, preferably 2 to 10 equivalents, and more preferably 3 to 5 equivalents with respect to the phosphinopyrazine-borane derivative represented by general formula (14).

The solvent that can be used in step B2 is not particularly limited, as long as the solvent can dissolve the phosphinopyrazine-borane derivative represented by general formula (14) and is inert to the phosphinopyrazine-borane derivative and the phosphinopyrazine derivative represented by general formula (6) to be formed. Examples thereof include ethyl acetate, tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

The reaction temperature of the deboranation reaction (1) is, from the viewpoint of carrying out the reaction efficiently, preferably −20 to 80° C., and more preferably 10 to 50° C. The reaction time of the deboranation reaction (1) is preferably 10 minutes or more, and more preferably 1 to 10 hours.

After the deboranation reaction (1) is finished, purification by a conventional method such as separation and washing, extraction, column chromatography, distillation, and desolvation can optionally be carried out to preferably remove the solvent and obtain the phosphinopyrazine derivative represented by general formula (6).

Step B3 is a step in which a nucleophilic substitution reaction (2) is carried out by making a deprotonated product obtained by deprotonating the optically active phosphine-borane represented by general formula (7) to act on the phosphinopyrazine derivative represented by general formula (6) obtained in step B2 to obtain an optically active phosphinopyrazine-borane derivative represented by the following general formula (15).

[Formula 26]

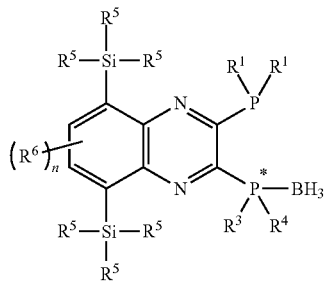

(15)

wherein $R^1$, $R^3$, $R^4$, $R^5$, $R^6$, n, and * have the same meaning as in general formula (3).

In step B3, in order to carry out the nucleophilic substitution reaction (2), first, a liquid including the phosphinopyrazine derivative represented by general formula (6) (hereinafter, referred to as "liquid E") is prepared, and separately from the liquid E, a liquid in which the optically active phosphine-borane represented by general formula (7) is deprotonated (hereinafter, referred to as "liquid F") is prepared.

The liquid E may be a solution or a slurry. The solvent that can be used in the liquid E is preferably, for example, a solvent that can dissolve the phosphinopyrazine derivative represented by general formula (6) and that is inert to the phosphinopyrazine derivative represented by general formula (6). Examples of the solvent include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent. Further, it is not necessary to completely dissolve the phosphinopyrazine derivative represented by general formula (6), and the reaction can be started even in a slurry state.

The concentration of the phosphinopyrazine derivative represented by general formula (6) in the liquid E is, from the viewpoints of productivity and controlling side reactions, preferably 1 to 80% by mass, and more preferably 1 to 30% by mass.

The liquid F is a solution including an optically active phosphine-borane compound obtained by deprotonating the optically active phosphine-borane represented by general formula (7).

The optically active phosphine-borane of the liquid F is represented by the following general formula (7).

[Formula 27]

(7)

wherein $R^3$, $R^4$, and * have the same meaning as in general formula (3), and $R^3$ and $R^4$ are not the same group.

$R^3$ and $R^4$ in the formula of general formula (7) respectively correspond to $R^3$ and $R^4$ in the formula of the optically active form of the 2,3-bisphosphinopyrazine derivative of general formula (3). $R^3$ and $R^4$ represent an optionally substituted straight-chain or branched alkyl group having 1 to 10 carbon atoms, an optionally substituted cycloalkyl group, an optionally substituted adamantyl group, or an optionally substituted phenyl group.

The optically active phosphine-borane represented by general formula (7) can be produced by a known method. Examples of the method for producing the phosphine-borane represented by general formula (7) include the methods described in Japanese Patent Laid-Open No. 2001-253889, Japanese Patent Laid-Open No. 2003-300988, Japanese Patent Laid-Open No. 2007-70310, Japanese Patent Laid-Open No. 2010-138136, J. Org. Chem, 2000, vol. 65, P4185-4188, and the like.

Examples of the method for preparing the liquid F include a method of mixing a liquid in which the optically active phosphine-borane represented by general formula (7) is dissolved in a solvent with a base. This mixing enables the optically active phosphine-borane represented by general formula (7) to be deprotonated. A preferable example of the mixing method includes a method of adding the base to a liquid in which the optically active phosphine-borane represented by general formula (7) is dissolved in a solvent.

The solvent used for dissolving the optically active phosphine-borane represented by general formula (7) is not particularly limited, as long as the solvent is inert to the optically active phosphine compound represented by general formula (7) and to the optically active phosphine compound that is produced from the optically active phosphine-borane by deprotonation. Examples of the solvent include tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

In the preparation of the liquid F, the concentration of the optically active phosphine-borane represented by general formula (7) in the solvent is, from the viewpoint of improving reactivity and productivity, preferably 1 to 80% by mass, and more preferably 5 to 30% by mass.

In the preparation of the liquid F, examples of the base used for deprotonation include n-butyllithium, lithium diisopropylamide, methylmagnesium bromide, potassium t-butoxide, Hunig's base, potassium hydroxide, and sodium hydroxide, and n-butyllithium is preferable.

The amount of the base used is, from the viewpoints of economic efficiency and reactivity and the viewpoint of controlling side reactions, in terms of the molar ratio of the base to the optically active phosphine-borane represented by general formula (7), preferably 1.0 to 2.0, and more preferably 1.0 to 1.5.

The temperature of the base during the mixing with the liquid including the optically active phosphine-borane represented by general formula (7) is set to, from the viewpoints of economic efficiency and maintaining chiral purity, preferably −80 to 50° C., and more preferably to −20 to 20° C.

By mixing a liquid including the optically active phosphine-borane represented by general formula (7) and a base, the deprotonation of the optically active phosphine-borane represented by general formula (7) is rapidly carried out. However, an aging reaction can optionally be carried out subsequently to the completion of the mixing with the base in order to complete the deprotonation reaction. Further, it is not necessary for the deprotonation reaction to be carried out to completion. When the phosphinopyrazine derivative represented by general formula (6) does not react or reacts extremely slowly with the base for the deprotonation reaction, the optically active phosphinopyrazine-borane derivative represented by general formula (15) can be obtained also in the form of a so-called equilibrium reaction in which the deprotonation reaction is occurring simultaneously with the deprotonated optically active phosphine-borane reacting with the phosphinopyrazine derivative.

In the reaction in step B3, mixing the liquid E and the liquid F enables the nucleophilic substitution reaction (2) to be carried out to obtain the optically active phosphinopyrazine-borane derivative represented by general formula (15). The method of mixing the liquid E and the liquid F may be a method of adding the liquid E to the liquid F, or a method of adding the liquid F to the liquid E.

From the viewpoints of economic efficiency and reactivity, it is preferable to carry out the mixing of the liquid E and the liquid F such that the molar ratio of the optically active phosphine compound deprotonated from the optically active phosphine-borane represented by general formula (7) to the phosphinopyrazine derivative represented by general formula (6) in the liquid E is 1.0 to 2.0, and more preferably 1.0 to 1.5.

In addition, when the liquid E or the liquid F is added to the other and the two liquids are mixed together, from the viewpoint of obtaining a product having a stable quality, it is preferable to add the liquid E or the liquid F to the other at a constant rate.

When the liquid E or the liquid F is added to the other and the two liquids are mixed together, from the viewpoint of obtaining a product having a high optical purity in a high yield, the addition temperature of the liquid E or the liquid F is preferably −80 to 50° C., and more preferably −80 to 20° C.

After the liquid E and the liquid F have been mixed, an aging reaction for completing the nucleophilic substitution reaction (2) can then optionally be carried out. The reaction temperature in the case of carrying out this aging reaction is, from the viewpoint of efficiently promoting the reaction in a high optical purity state, preferably −80 to 50° C., and particularly preferably −20 to 30° C.

After the nucleophilic substitution reaction (2) is finished, purification by a conventional method such as separation and washing, extraction, distillation, and desolvation can optionally be carried out to preferably remove the solvent and obtain the optically active phosphinopyrazine-borane derivative represented by general formula (15).

Step B4 is a step in which the optically active phosphinopyrazine-borane derivative represented by general formula (15) obtained in step B3 is subjected to a deboranation reaction (2) in a solvent by a deboranation agent to obtain the target optically active 2,3-bisphosphinopyrazine derivative represented by general formula (3).

Examples of the deboranation agent used in step B4 include N,N,N',N'-tetramethylethylenediamine (TMEDA), triethylenediamine (DABCO), triethylamine, $HBF_4$, and trifluoromethanesulfonic acid, and TMEDA is preferable. The amount of the deboranation agent added is generally, preferably 2 to 10 equivalents, and more preferably 3 to 5 equivalents with respect to the amount of the optically active phosphinopyrazine-borane derivative represented by general formula (15).

The solvent that can be used in step B4 is not particularly limited, as long as the solvent can dissolve the phosphinopyrazine-borane derivative represented by general formula (15) and is inert to the phosphinopyrazine-borane derivative and the optically active form of the optically active 2,3-bisphosphinopyrazine derivative represented by general formula (3) to be formed. Examples thereof include ethyl acetate, tetrahydrofuran, N,N-dimethylformamide, diethyl ether, dimethoxyethane, cyclopentyl methyl ether, tert-butyl methyl ether, dioxane, hexane, and toluene. These solvents can be used singly or as a mixed solvent.

The reaction temperature of the deboranation reaction (2) is, from the viewpoint of efficiently promoting the reaction in a high optical purity state, preferably −20 to 80° C., and more preferably 10 to 50° C. The reaction time of the deboranation reaction (2) is preferably 10 minutes or more, and more preferably 1 to 10 hours.

After the deboranation reaction (2) is finished, purification by a conventional method of separation and washing, extraction, crystallization, distillation, sublimation, and column chromatography can optionally be carried out to obtain the target optically active form of the 2,3-bisphosphinopyrazine derivative represented by general formula (3).

In the method for producing the optically active 2,3-bisphosphinopyrazine derivative represented by general formula (3) described above, a deprotonated product of the phosphine-borane represented by formula (5b) is made to act on the 2,3-dihalogenopyrazine derivative represented by general formula (4), then deboranation is carried out, and a deprotonated product of the phosphine-borane represented by formula (7) is made to act on the obtained phosphinopyrazine derivative represented by formula (6). However, instead of that method, the deprotonated product of the phosphine-borane represented by formula (7) may first be made to act on the 2,3-dihalogenopyrazine derivative represented by formula (4), and an aromatic nucleophilic substitution reaction and a deboranation reaction may be carried out. In this case, the optically active 2,3-bisphosphinopyrazine derivative represented by formula (3) is then obtained by making the deprotonated product of the phosphine-borane represented by formula (5b) to act on the obtained phosphinopyrazine derivative, and carrying out an aromatic nucleophilic substitution reaction and a deboranation reaction.

However, as described above, it is preferable to, first, make the deprotonated product of the phosphine-borane represented by formula (5b) to act on the derivative of formula (4) because this enables the optically active 2,3-bisphosphinopyrazine derivative represented by formula (3) to be obtained with an increased optical purity.

Further, in the method for producing the derivative represented by general formula (3) described above, instead of either one or both of steps (B1) and (B2) and steps (B3), (B4) and (B), a method of mixing a liquid including the 2,3-dihalogenopyrazine derivative, optically active phosphine-borane, and deboranation agent with a base, described in the method for producing the derivative represented by formula (2) may be used.

The optically active form of the 2,3-bisphosphinopyrazine derivative represented by general formula (1) according to the present invention can form, as a ligand, a complex with a transition metal. This transition metal complex is useful as an asymmetric synthesis catalyst. Examples of asymmetric synthesis particularly include an asymmetric boronation reaction such as a cis-selective asymmetric boryl cyclization reaction or an enantioselective γ-position boron substitution reaction using an E-form substrate, an asymmetric hydrogenation reaction of a dehydroamino acid, an asymmetric coupling reaction involving a C—C bond or a C—N bond, an asymmetric hydrosilylation reaction, and an asymmetric Michael reaction.

Examples of transition metals capable of forming a complex include rhodium, ruthenium, iridium, palladium, nickel, iron, and copper, and rhodium metal or copper metal is preferable.

The method for forming a complex with rhodium metal using an optically active form of the 2,3-bisphosphinopyrazine derivative represented by general formula (1) as a ligand may be carried out in accordance with, for example, a method described in Experimental Chemistry Course, 4th Edition (edited by The Chemical Society of Japan, published by Maruzen Co., Ltd., Vol. 18, pp. 327 to 353. For example, the rhodium complex can be produced by reacting the optically active form of 2,3-bisphosphinopyrazine derivative represented by general formula (1) with bis(cyclooctane-1,5-diene)rhodium hexafluoroantimonate, bis(cyclooctane-1,5-diene)rhodium tetrafluoroborate, or the like.

The method for forming a complex with palladium metal using an optically active 2,3-bisphosphinopyrazine derivative represented by general formula (1) as a ligand may be carried out in accordance with, for example, a method described in "Y. Uozumi and T. Hayashi, J. Am. Chem. Soc., 1991, 113, 9887". For example, the palladium complex can be produced by reacting the optically active form of 2,3-bisphosphinopyrazine derivative represented by general formula (1) with it-allylpalladium chloride.

As a method for forming a complex with copper metal using an optically active form of the 2,3-bisphosphinopyrazine derivative represented by general formula (1) as a ligand, such a complex can be easily produced by, for example, mixing an optically active form of the 2,3-bisphosphinopyrazine derivative represented by general formula (1) with a copper(I) salt in a solvent. Examples of the copper(I) salt include CuF, CuCl, CuBr, CuI, CuPF$_6$, CuBPh$_4$, CuBF$_4$, CuOAc, Cu(OtBu), and CuBF$_4$(MeCN)$_4$.

A copper metal complex formed by using an optically active form of the 2,3-bisphosphinopyrazine derivative represented by general formula (1) as a ligand with copper metal (hereinafter, sometimes simply referred to as "copper metal complex") is particularly useful as an asymmetric catalyst for an asymmetric boronation reaction such as a cis-selective asymmetric boryl cyclization reaction or an enantioselective γ-position boron substitution reaction using an E-form substrate.

The method for producing an organic boron compound according to the present invention produces an organic boron compound by a cis-selective asymmetric boryl cyclization reaction or an enantioselective γ-position boron substitution reaction using the copper metal complex of the present invention as an asymmetric catalyst.

That is, the method for producing an organic boron compound according to the present invention is characterized by producing the organic boron compound represented by general formula (10) or general formula (11) by using the copper metal complex of the present invention as an asymmetric catalyst (hereinafter, sometimes simply referred to as "asymmetric catalyst"), and subjecting the allyl compound represented by general formula (8) and the diboron compound represented by general formula (9) to a coupling reaction in the presence of the asymmetric catalyst.

The allyl compound as a starting material in the method for producing the organic boron compound of the present invention is represented by the following general formula (8).

[Formula 28]

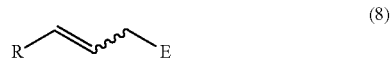

(8)

wherein R represents a hydrogen atom, an alkyl group, a substituted alkyl group, a cycloalkyl group, a substituted cycloalkyl group, an aralkyl group, a substituted aralkyl group, an aryl group, a substituted aryl group, an aliphatic heterocyclic group, a substituted aliphatic heterocyclic group, an aromatic heterocyclic group, a substituted aromatic heterocyclic group, an alkoxy group, a substituted alkoxy group, an aralkyloxy group, a substituted aralkyloxy group, an aryloxy group, a substituted aryloxy group, an alkyloxycarbonyl group, an aralkyloxycarbonyl group, a substituted silyl group or substituted silyloxy group, an amino group, a substituted amino group, an alkylaminocarboxy group, a substituted alkylaminocarboxy group, an arylaminocarboxy group, an alkyloxycarbonyloxy group, an aryloxycarbonyloxy group, or a halogen atom, E is a leaving group and represents a carbonate group, a carboxylate group, an ether group, a phosphate group or a sulfonate group, and a wavy line indicates that both a trans form and a cis form are possible.

An alkyl group represented by R in the formula of general formula (8) may be in the form of a straight-chain or a branch. Examples of the alkyl group include alkyl groups having 1 to 6 carbon atoms. Specifically, examples include a methyl group, an ethyl group, an n-propyl group, a 2-propyl group, an n-butyl group, a 2-butyl group, an isobutyl group, a tert-butyl group, an n-pentyl group, a 2-pentyl group, a tert-pentyl group, a 2-methylbutyl group, a 3-methylbutyl group, a 2,2-dimethylpropyl group, an n-hexyl group, a 2-hexyl group, a 3-hexyl group, a tert-hexyl group, a 2-methylpentyl group, a 3-methylpentyl group, a 4-methylpentyl group, and a 5-methylpentyl group.

Examples of the cycloalkyl group represented by R in the formula of general formula (8) include cycloalkyl groups having 3 to 7 carbon atoms. Specifically, examples include a cyclopropyl group, a cyclobutyl group, a cyclopentyl group, a cyclohexyl group, a 2-methylcyclopentyl group, a 3-methylcyclopentyl group, a cycloheptyl group, a 2-methylcyclohexyl group, a 3-methylcyclohexyl group, and a 4-methylcyclohexyl group.

Examples of an aralkyl group represented by R in the formula of general formula (8) include aralkyl groups having 7 to 12 carbon atoms. Specifically, examples include a benzyl group, a 2-phenylethyl group, a 1-phenylpropyl group, a 2-phenylpropyl group, a 3-phenylpropyl group, a 1-phenylbutyl group, a 2-phenylbutyl group, a 3-phenylbutyl group, a 4-phenylbutyl group, a 1-phenylpentyl group, a 2-phenylpentyl group, a 3-phenylpentyl group, a 4-phenylpentyl group, a 5-phenylpentyl group, a 1-phenylhexyl group, a 2-phenylhexyl group, a 3-phenylhexyl group, a 4-phenylhexyl group, a 5-phenylhexyl group, and a 6-phenylhexyl group.

Examples of the aryl group represented by R in the formula of general formula (8) include aryl groups having 6 to 14 carbon atoms. Specifically, examples include a phenyl group, a methylphenyl group, a dimethylphenyl group, a naphthyl group, and an anthryl group.

An aliphatic heterocyclic group represented by R in the formula of general formula (8) is, for example, preferably a 5- or 6-membered aliphatic heterocyclic group. Examples thereof include aliphatic heterocyclic groups containing 1 to 3 heteroatoms such as a nitrogen atom, an oxygen atom, and a sulfur atom. Specifically, examples include a pyrrolidyl-2-on group, a piperidino group, a piperazinyl group, a morpholino group, a tetrahydrofuryl group, and a tetrahydropyranyl group.

An aromatic heterocyclic group represented by R in the formula of general formula (8) is, for example, preferably a 5- or 6-membered monoaromatic heterocyclic group or polyaromatic heterocyclic group. Examples thereof include aromatic heterocyclic groups containing 1 to 3 heteroatoms such as a nitrogen atom, an oxygen atom and a sulfur atom. Specifically, examples include a pyridyl group, an imidazolyl group, a thiazolyl group, a furfuryl group, a pyranyl group, a furyl group, a benzofuryl group, and a thienyl group.

An alkoxy group represented by R in the formula of general formula (8) may be in the form of a straight-chain, a branch, or a ring. Examples of the alkoxy group include alkoxy groups having 1 to 6 carbon atoms. Specifically, examples include a methoxy group, an ethoxy group, an n-propoxy group, a 2-propoxy group, an n-butoxy group, a 2-butoxy group, an isobutoxy group, a tert-butoxy group, an n-pentyloxy group, a 2-methylbutoxy group, a 3-methylbutoxy group, a 2,2-dimethylpropyloxy group, an n-hexyloxy group, a 2-methylpentyloxy group, a 3-methylpentyloxy group, a 4-methylpentyloxy group, a 5-methylpentyloxy group, and a cyclohexyloxy group.

Examples of the aralkyloxy group represented by R in the formula of general formula (8) include aralkyloxy groups having 7 to 12 carbon atoms. Specifically, examples include a benzyloxy group, a 2-phenylethoxy group, a 1-phenylpropoxy group, a 2-phenylpropoxy group, a 3-phenylpropoxy group, a 1-phenylbutoxy group, a 2-phenylbutoxy group, a 3-phenylbutoxy group, a 4-phenylbutoxy group, a 1-phenylpentyloxy group, a 2 phenylpentyloxy group, a 3-phenylpentyloxy group, a 4-phenylpentyloxy group, a 5-phenylpentyloxy group, a 1-phenylhexyloxy group, a 2-phenylhexyloxy group, a 3-phenylhexyloxy group, a 4-phenylhexyloxy group, a 5-phenylhexyloxy group, and a 6-phenylhexyloxy group.

Examples of the aryloxy group represented by R in the formula of general formula (8) include aryloxy groups having 6 to 14 carbon atoms. Specifically, examples include a phenyloxy group, a naphthyloxy group, and an anthryloxy group.

An alkyloxy carbonyl group represented by R in the formula of general formula (8) may be in the form of a straight-chain or a branch. Examples of the alkyloxy carbonyl group include alkyloxy carbonyl groups having 2 to 7 carbon atoms. Specifically, examples include a methoxy carbonyl group, an ethoxycarbonyl group, a propoxycarbonyl group, a butoxycarbonyl group, a tert-butoxycarbonyl group, a pentyloxycarbonyl group, a hexyloxycarbonyl group, and a heptyloxycarbonyl group.

Examples of an aralkyloxycarbonyl group represented by R in the formula of general formula (8) include aralkyloxycarbonyl groups having 8 to 12 carbon atoms. Specifically, examples include a benzyloxy carbonyl group and a phenylethoxy carbonyl group.

Examples of a substituted alkyl group include alkyl groups in which at least one hydrogen atom of the alkyl group has been replaced with a substituent such as an alkyl group, a cycloalkyl group, an alkoxy group, a halogen atom, an amino group, or an amino group having a protective group.

Examples of a substituted cycloalkyl group include cycloalkyl groups in which at least one hydrogen atom of the cycloalkyl group has been replaced with a substituent such as an alkyl group, a cycloalkyl group, an alkoxy group, a halogen atom, an amino group, or an amino group having a protective group.

Examples of a substituted aralkyl group include aralkyl groups in which at least one hydrogen atom of the aralkyl group has been replaced with a substituent such as an alkyl group, a cycloalkyl group, an alkyl halide group, an alkoxy group, a halogen atom, an amino group, or an alkyl group-substituted amino group.

Examples of a substituted aryl group include aryl groups in which at least one hydrogen atom of the aryl group has been replaced with a substituent such as an alkyl group, a cycloalkyl group, an alkyl halide group, an alkoxy group, a halogen atom, an amino group, or an alkyl group-substituted amino group, or aryl groups in which two adjacent hydrogen atoms of the aryl group have been substituted with a substituent such as an alkylenedioxy group.

Examples of a substituted aliphatic heterocyclic group include aliphatic heterocyclic groups in which at least one hydrogen atom of the aliphatic heterocyclic groups has been replaced with a substituent such as an alkyl group, a cycloalkyl group, an alkyl halide group, an alkoxy group, or a halogen atom.

Examples of a substituted aromatic heterocyclic group include aromatic heterocyclic groups in which at least one hydrogen atom of the aromatic heterocyclic group has been replaced with a substituent such as an alkyl group, a cycloalkyl group, an alkyl halide group, an alkoxy group, or a halogen atom.

Examples of a substituted alkoxy group include alkoxy groups in which at least one hydrogen atom of the alkoxy group has been replaced with a substituent such as an alkyl group, a cycloalkyl group, an alkoxy group, a halogen atom, an amino group, or an amino group having a protective group.

Examples of a substituted aralkyloxy group include aralkyloxy groups in which at least one hydrogen atom of the aralkyloxy group has been replaced with a substituent such as an alkyl group, a cycloalkyl group, an alkyl halide group, an alkoxy group, a halogen atom, an amino group, or an alkyl group-substituted amino group.

Examples of a substituted aryloxy group include aryloxy groups in which at least one hydrogen atom of the aryloxy group has been replaced with a substituent such as an alkyl group, a cycloalkyl group, an alkyl halide group, an alkoxy group, a halogen atom, an amino group, or an alkyl group-substituted amino group, or aryloxy groups in which two adjacent hydrogen atoms of the aryloxy group have been substituted with an alkylenedioxy group or the like.

Examples of a substituted silyl group include silyl groups in which at least one hydrogen atom of a silyl group has been replaced with a substituent such as an alkyl group, a cycloalkyl group, an alkyl halide group, an alkoxy group, a halogen atom, an amino group, an alkyl group-substituted amino group, or an aryl group.

Examples of a substituted silyloxy group include silyloxy groups in which at least one hydrogen atom of the silyloxy group has been replaced with a substituent such as an alkyl group, a cycloalkyl group, an alkyl halide group, an alkoxy group, a halogen atom, an amino group, an alkyl group-substituted amino group, or an aryl group.

The above-mentioned substituents, namely the substituents of a substituted alkyl group, a substituted cycloalkyl group, a substituted aralkyl group, a substituted aryl group, a substituted aliphatic heterocyclic group, a substituted aromatic heterocyclic group, a substituted alkoxy group, a substituted aralkyloxy group, a substituted aryloxy group and a substituted amino group, will be described in the following.

Examples of the alkyl groups, cycloalkyl groups, and alkoxy groups as a substituent include the same groups as the groups described above as examples of the alkyl group, cycloalkyl group, and alkoxy group as the above-mentioned R. Examples of halogen atoms include a fluorine atom, a chlorine atom, a bromine atom, and an iodine atom.

Examples of the alkylenedioxy group include alkylenedioxy groups having 1 to 3 carbon atoms. Specifically, examples include a methylenedioxy group, an ethylenedioxy group, a propylenedioxy group, and a trimethylenedioxy group.

Examples of an alkyl halide group include alkyl halide groups having 1 to 6 carbon atoms formed by halogenating (for example, fluorinating, chlorinating, brominating, or iodinating) the alkyl groups mentioned above as examples of R. Specifically, examples include a chloromethyl group, a bromomethyl group, a trifluoromethyl group, a 2-chloroethyl group, a 3-chloropropyl group, a 3-bromopropyl group, and a 3,3,3-trifluoropropyl group.

Examples of an alkyl group-substituted amino group include amino groups in which one or two hydrogen atoms of the amino group are have been substituted with an alkyl group mentioned above as examples of R and/or a cycloalkyl group mentioned above as examples of R. Specific examples of the alkyl group-substituted amino group include monosubstituted amino groups such as a methylamino group, an ethylamino group, a propylamino group, a butylamino group, a pentylamino group, and a hexylamino group, and disubstituted amino groups such as a dimethylamino group, a diethylamino group, a dipropylamino group, a dibutylamino group, a dipentylamino group, and a dihexylamino group.

Examples of a protective group include any group that can be used as an amino protective group, such as those described as amino protective groups in "PROTECTIVE GROUPS IN ORGANIC SYNTHESIS, Second Edition (JOHN WILEY & SONS, INC.)." Specific examples of the amino protective group include an alkyl group, a cycloalkyl group, an aralkyl group, an acyl group, and an alkyloxy carbonyl group.

The alkyl groups, cycloalkyl groups, and aralkyl groups as a protective group are the same as the alkyl groups, cycloalkyl groups, and aralkyl groups represented by R described above. An acyl group may be in the form of a straight-chain, a branch, or a ring. Examples include acyl groups having 2 to 7 carbon atoms derived from a carboxylic acid. Specifically, examples include an acetyl group, a propionyl group, a butyryl group, a pentanoyl group, a hexanoyl group, and a benzoyl group. Examples of an alkyloxy carbonyl group include a tert-butyloxy carbonyl group and a benzyloxy carbonyl group.

Examples of an amino group having a protective group include amino groups protected by the above-mentioned protective groups. Specific examples of an amino group having a protective group include an acetylamino group, a benzoylamino group, a tert-butyloxy carbonyl amino group, a benzyloxy carbonyl amino group, and a cyclic amino group.

Examples of a cyclic amino group include cyclic amines in which an alkylene chain such as a butylene group or a pentylene group, —$CH_2CH_2OCH_2CH_2$—, —$CH_2CH_2NHCH_2CH_2$—, —$CH_2CH_2OCO$— groups, and the like are bonded to a nitrogen atom. Specific examples thereof include a morpholino group, a piperidino group, and a 1,3-oxazoline-2-on-1-yl group.

Examples of a substituted amino group represented by R in the formula of general formula (8) include those mentioned above as examples of an alkyl group-substituted amino group and an amino group having a protecting group.

Examples of an alkylaminocarboxy group, a substituted alkylaminocarboxy group, and an arylaminocarboxy group represented by R in the formula of general formula (8) include —$CON(R_m)_2$ (wherein $R_m$ is a substituted or unsubstituted alkyl group having 1 to 8 carbon atoms, a substituted or unsubstituted aryl group having 6 to 12 carbon atoms, or a hydrogen atom, and at least one of $R_m$ is a substituted or unsubstituted alkyl group having 1 to 8 carbon atoms or a substituted or unsubstituted aryl group having 6 to 12 carbon atoms).

Examples of the alkyloxycarbonyloxy group represented by R in the formula of general formula (8) include methoxycarbonyloxy, ethoxycarbonyloxy, n-propoxycarbonyloxy, isopropoxycarbonyloxy, n-butoxycarbonyloxy, isobutoxycarbonyloxy, tert-butoxycarbonyloxy, sec-butoxycarbonyloxy, n-pentyloxycarbonyloxy, neopentyloxycarbonyloxy, n-hexyloxycarbonyloxy, isohexyloxycarbonyloxy, 3-methylpentyloxycarbonyloxy group, cyclopropyloxycarbonyloxy, cyclobutyloxycarbonyloxy, cyclopentyloxycarbonyloxy, cyclohexyloxycarbonyloxy, cycloheptyloxycarbonyloxy, and cyclooctyloxycarbonyloxy.

Examples of an aryloxycarbonyloxy group represented by R in the formula of general formula (8) include phenoxycarbonyloxy, 1-naphthyloxycarbonyloxy, and 2-naphthyloxycarbonyloxy.

The leaving group represented by E in the formula of general formula (8) is a carbonate group, a carboxylate group, an ether group, a phosphate group, or a sulfonate group.

Preferable examples of a carbonate group as E in the formula of general formula (8) include groups represented by (*—O—CO—O—$R^{200}$, wherein * represents a bond and $R^{200}$ represents a hydrocarbon group). Examples thereof include various groups, for instance alkyl carbonates, such as methyl carbonate, ethyl carbonate, isopropyl carbonate, and tert-butyl carbonate, and benzyl carbonates.

Preferable examples of a carboxylate group as E in the formula of general formula (8) include groups represented by (*—O—CO—$R^{201}$, wherein represents a bond and $R^{201}$ represents a hydrocarbon group). Examples thereof include an acetoxy group and a benzoyloxy group.

Preferable examples of an ether group as E in the formula of general formula (8) include groups represented by (*—O—$R^{202}$, wherein represents a bond and $R^{202}$ represents a hydrocarbon group). Examples thereof include alkoxy groups such as a methoxy group, an ethoxy group, an isopropyl group, and a tert-butoxy group, and a benzyloxy group.

Preferable examples of a phosphate group as E in the formula of general formula (8) include groups represented by (*—O—PO—(OR$^{203}$)$_2$, wherein represents a bond and R$^{203}$ each independently represents a hydrocarbon group). Examples thereof include alkyl phosphates such as dimethyl phosphate and diethyl phosphate, alkyl benzyl phosphates, and dibenzyl phosphates.

Preferable examples of a sulfonate group as E in the formula of general formula (8) include groups represented by (*—O—SO$_2$—R$^{204}$, wherein represents a bond and R$^{204}$ represents a hydrocarbon group). Examples thereof include methanesulfonic acid ester, p-toluenesulfonic acid ester, and trifluoromethanesulfonic acid ester.

Examples of the hydrocarbon group represented by R$^{201}$, R$^{202}$, R$^{203}$, and R$^{204}$ include an alkyl group, an alkenyl group, an aryl group, and an arylalkyl group. From the viewpoint of reactivity and the like, the hydrocarbon group preferably has 10 or less carbon atoms, and particularly preferably 8 or less carbon atoms.

The allyl compound represented by general formula (8) can be either a trans form or a cis form, but since the cis form and the trans form have different reaction activities and have different enantioselectivities, it is necessary to select the structural isomer that can efficiently provide the desired target compound. In particular, it is preferable to use the trans form.

The diboron compound as the starting material in the method for producing the organic boron compound of the present invention is represented by the following general formula (9).

[Formula 29]

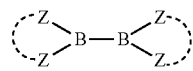
(9)

wherein Z represents an atom having the same or a different lone electron pair, a dotted line connecting adjacent Z indicates that another atom is bonded to the Z, and adjacent Z may form a ring via another atom.

Z in the diboron compound in the formula of general formula (9) is not particularly limited in terms of its type as long as it is an atom having a lone electron pair, such as an oxygen atom or a nitrogen atom. When Z has a lone electron pair, the lone electron pair acts with an empty orbital of an adjacent boron to form a diborane compound having an appropriate reactivity. In general formula (9), the four Z may be the same or different. Two adjacent Z may form a ring via another atom, or may not form a ring.

Examples of an atomic group forming a ring in the diboron compound represented by general formula (9) include those shown in the following (9a) to (9c). Examples of an atomic group that does not form a ring include those shown in the following (9d) to (9f).

[Formula 30]

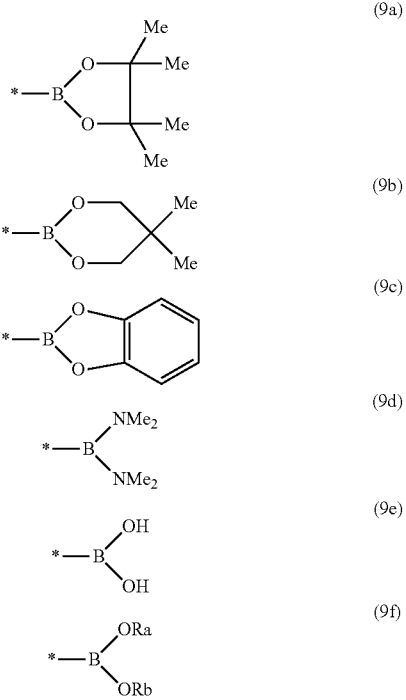

wherein Ra and Rb represent an optionally substituted alkyl group or aryl group that is the same or different, and * represents a bond.

The amount of the diboron compound represented by general formula (9) used is, in terms of the molar ratio of the diboron compound to the allyl compound represented by general formula (8), preferably 1.0 to 2.0, and more preferably 1.0 to 1.5.

In the method for producing the organic boron compound of the present invention, the asymmetric catalyst to be used is preferably a copper metal complex having an optically active form of the 2,3-bisphosphinopyrazine derivative represented by general formula (1) as a ligand. As the copper metal complex, a copper metal complex with a copper(I) salt is preferable, and a copper metal complex with CuOtBu, which is a cationic copper(I) salt, is particularly preferable.

The amount of the asymmetric catalyst used depends on, for example, the type of the allyl compound to be used, the reaction vessel used, the type of reaction, and economic efficiency, but is preferably 0.1 to 20 mol %, and more preferably 0.5 to 10 mol %, based on the allyl compound.

In the method for producing the organic boron compound of the present invention, potassium t-butoxide is preferable as one component of the catalyst. As a result of this additive, a copper metal complex CuOtBu is formed, and the catalytic reaction proceeds with a good yield. Lithium t-butoxide and sodium t-butoxide may also be used, but potassium t-butoxide is preferable.

The amount of potassium t-butoxide used is, in terms of the molar ratio to copper, preferably 1.0 to 5.0, and more preferably 1.0 to 2.5.

In addition, the method for producing the organic boron compound of the present invention can optionally be carried out in a solvent. The solvent is preferably a solvent that dissolves the allyl compound as a starting material and the organic boron compound as a product, and does not react with each reaction reagent.

Specific examples of the solvent include aromatic hydrocarbons such as benzene, toluene, and xylene; aliphatic hydrocarbons such as pentane, hexane, heptane, and octane; halogenated hydrocarbons such as ethylene chloride, chloroform, carbon tetrachloride, and dichloroethane; ethers such as diethyl ether, diisopropyl ether, tert-butylmethyl ether, dimethoxyethane, tetrahydrofuran (THF), tetrahydropyran (THP), dioxin, and dioxolan; amides such as N,N-dimethylformamide (DMF) and N,N-dimethylacetamide (DMA); alcohols such as methanol, ethanol and propanol, acetonitrile; N-methylpyrrolidone (NMP); dimethylsulfoxide (DMSO), and dimethylimidazolidinone (DMI). These solvents may be used singly or in appropriate combinations of two or more.

The reaction temperature is generally, in consideration of economic efficiency, preferably −20 to 60° C., and more preferably 0 to 30° C.

The reaction time depends on the type and amount of catalyst used, the type and concentration of the starting materials used, the reaction conditions such as the reaction temperature, and the like, but is generally preferably 1 hour or more, and more preferably 2 to 6 hours.

After the reaction is finished, purification by a conventional method such as crystallization, distillation, column chromatography, preparative HPLC, separation washing, extraction, and desolvation can optionally be carried out to obtain the target organic boron compound represented by general formula (10) or general formula (11).

The organic boron compound obtained by the present production method is used as an intermediate material for medical and agricultural chemicals and physiologically active substances, and is useful, for example, as a synthetic intermediate for antibiotics.

Compared with conventional 2,3-bis(dialkylphosphino) pyrazine derivatives (compound (A) and compound (B)), the optically active form of the 2,3-bisphosphinopyrazine derivative represented by general formula (1) according to the present invention has an improved catalytic performance particularly in asymmetric boronation reactions such as a cis-selective asymmetric boryl cyclization reaction or an enantioselective γ-position boron substitution reaction using an E-form substrate. Although the reason for the improved catalytic performance is uncertain, it may be that the introduction of a trialkylsilyl group onto positions 5 and 8 of the quinoxaline skeleton of conventional 2,3-bis(dialkylphosphino)pyrazine derivatives (compound (A) and compound (B)) causes steric repulsion to occur between the substituents on the phosphorus atom, and that this steric interaction effect brings about a change in the asymmetric recognition environment.

The transition metal complex having an optically active form of the 2,3-bisphosphinopyrazine derivative represented by general formula (1) according to the present invention as a ligand can also suitably be used as an asymmetric catalyst for an asymmetric hydrogenation reaction. As the transition metal in this case, rhodium, ruthenium, iridium, and palladium are preferable.

Further, the asymmetric hydrogenation catalyst according to the present invention can be used in reactions using known asymmetric hydrogenation catalysts (for example, refer to Japanese Patent Laid-Open No. 2010-208993, Japanese Patent Laid-Open No. 2007-56007, Japanese Patent Laid-Open No. 2000-319288, Japanese Patent Laid-Open No. 2013-6787, and Japanese Patent Laid-Open No. 2012-17288).

EXAMPLES

Hereinafter, the present invention will be described in detail with reference to examples, but the present invention is not limited to these examples.

It is noted that identification of the compounds was carried out using JNM-ECX400P and JNM-ECS400, manufactured by JEOL Ltd. The analysis conditions were: $^1$H NMR: 400 MHz, $^{13}$C NMR: 100 MHz, $^{31}$P NMR: 160 MHz.

Synthesis Example 1

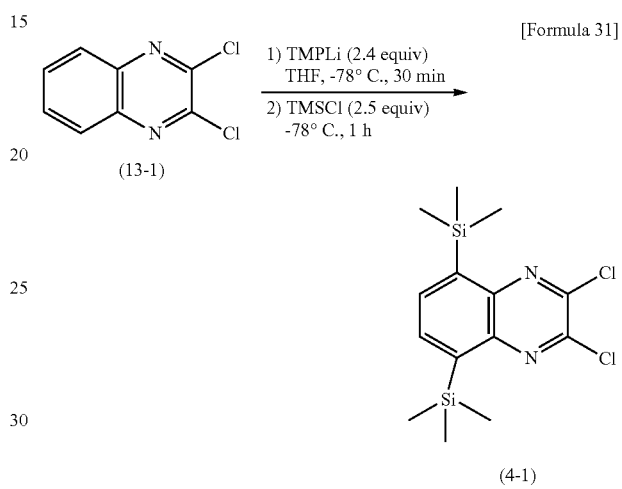

34.3 mL of THF in which lithium 2,2,6,6-tetramethylpiperidine (TMPLi) (0.56 M, 19.2 mmol) was dissolved was added at −78° C. to 32 mL of THF in which 2,3-dichloroquinoxaline (13-1) (8.0 mmol, 1.59 g) was dissolved. After stirring for 30 minutes, trimethylsilyl chloride (TMSCl) (20 mmol, 2.54 mL) was added to the reaction solution, stirring was carried out for 1 hour, and then the reaction was quenched with aqueous NH$_4$Cl. The organic layer was extracted with ethyl acetate (EtOAc) three times, dehydrated with sodium sulfate, and then filtered. The solvent was removed from the filtrate under reduced pressure by an evaporator to obtain a residue. The obtained residue was purified by flash column chromatography (SiO$_2$, hexane) to obtain 1.9 g of a 2,3-dihalogenopyrazine derivative (4-1). Yield 70%.

(Identification Data of the 2,3-Dihalogenopyrazine Derivative (4-1))

$^1$H NMR (500 MHz, CDCl$_3$, δ): 0.42 (s, 18H), 7.88 (s, 2H).

$^{13}$C NMR (125 MHz, CDCl$_3$, δ): 0.5, 136.7, 142.5, 143.0, 144.6.

Synthesis Example 2

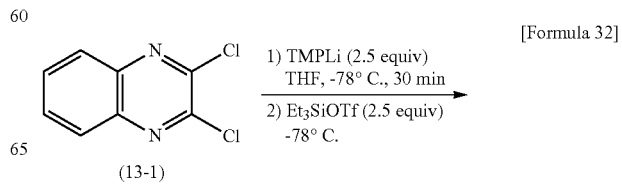

-continued

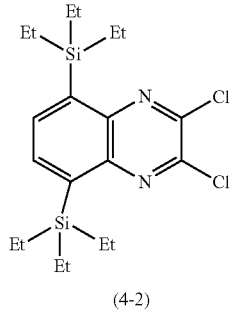

(4-2)

34.3 mL of THF in which lithium 2,2,6,6-tetramethylpiperidine (TMPLi) (18.9 mmol) was dissolved was added over 30 minutes at −78° C. to 38 mL of THF in which 2,3-dichloroquinoxaline (13-1) (7.5 mmol, 1.50 g) was dissolved. After stirring for 1.5 hours, triethylsilyl triflate (Et₃SiOTf) (18.9 mmol, 5.0 g) was added to the reaction solution, stirring was carried out for 3 hours, and then the reaction was quenched with aqueous NH₄Cl. The organic layer was extracted with ethyl acetate (EtOAc) three times, dehydrated with sodium sulfate, and then filtered. The solvent was removed from the filtrate under reduced pressure by an evaporator to obtain a residue. The obtained residue was purified by flash column chromatography (SiO₂, hexane) to obtain 2.9 g of a 2,3-dihalogenopyrazine derivative (4-2). Yield 89%.

(Identification Data of the 2,3-Dihalogenopyrazine Derivative (4-2))

$^1$H NMR (500 MHz, CDCl₃, δ): 0.92-1.04 (m, 30H), 7.87 (s, 2H). $^{13}$C NMR (125 MHz, CDCl₃, δ): 4.0, 7.6, 137.9, 140.2, 143.0, 144.9.

Synthesis Example 3

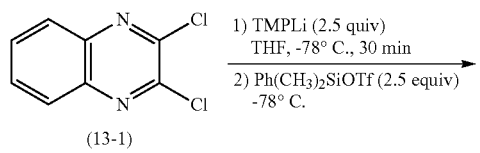

(13-1)

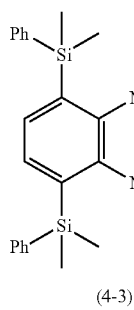

(4-3)

A reaction was carried out in the same manner as in Synthesis Example 2 to obtain a 2,3-dihalogenopyrazine derivative (4-3), except that triethylsilyl triflate (Et₃SiOTf) was changed to dimethylphenylsilyl triflate (Ph(CH₃)₂SiOTf).

(Identification Data of 2,3-Dihalogenopyrazine Derivative (4-2))

$^1$H NMR (400 MHz, CDCl₃, δ): 0.88-1.04 (m, 30H), 7.86 (s, 2H). $^{13}$C NMR (100 MHz, CDCl₃, δ): 3.8, 7.6, 137.8, 140.1, 142.9, 144.8. HRMS-ESI (m/z): [M+]+ calcd for C₁₈H₂₇Cl₂N₂Si₂, 397.10898. found, 397.10871.

Synthesis Example 4

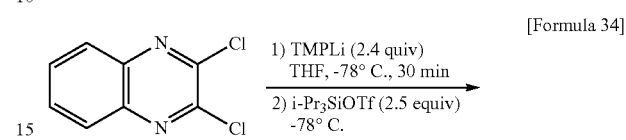

(13-1)

[Formula 34]

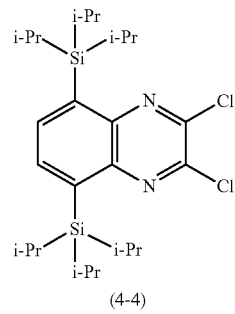

(4-4)

A reaction was carried out in the same manner as in Synthesis Example 2 to obtain a 2,3-dihalogenopyrazine derivative (4-4), except that triethylsilyl triflate (Et₃SiOTf) was changed to triisopropylsilyl triflate (i-Pr₃SiOTf).

(Identification Data of 2,3-Dihalogenopyrazine Derivative (4-4))

$^1$H NMR (500 MHz, CDCl₃, δ): 1.09 (d, J=8.0 Hz, 36H), 1.67 (septet, J=8.0 Hz, 6H). 7.94 (s, 2H). $^{13}$C NMR (125 MHz, CDCl₃, δ): 12.0, 19.1, 138.8, 139.0, 142.6, 145.3.

Example 1

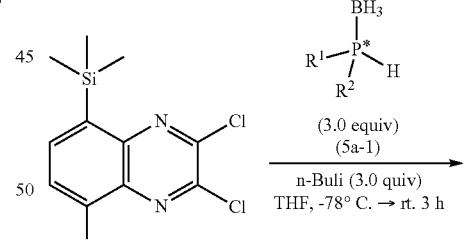

(4-1)

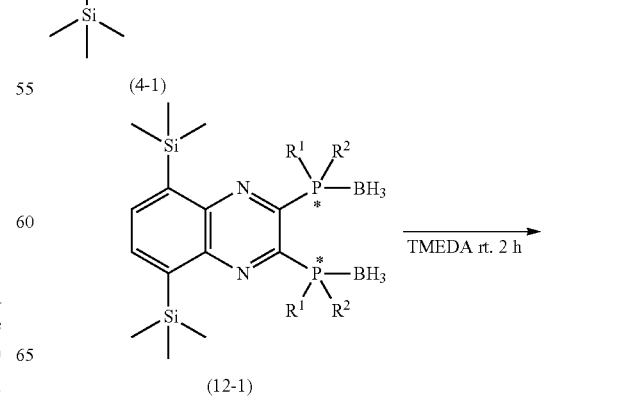

(12-1)

[Formula 35]

Example 2

[Formula 36]

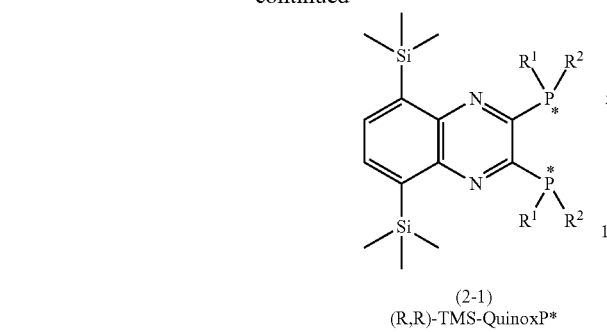

(2-1)
(R,R)-TMS-QuinoxP*

$R^1$ = tert-Butyl
$R^2$ = Me wherein, $R^1$ represents a tert-butyl group, $R^2$ represents a methyl group, and has the same meaning as in general formula (2).

(Step A1)

The S-optically active form of phosphine-borane (6.0 mmol, 708 mg) was dissolved in THF (12 ml). To this solution, 3.9 ml of a solution of n-BuLi (1.55 M, 6.0 mmol) in hexane was added dropwise at −78° C. under a nitrogen atmosphere to obtain a liquid B.

The 2,3-dihalogenopyrazine derivative (4-1) (2.0 mmol, 686 mg) prepared above was dissolved in THF (12 ml) to obtain a liquid A.

The liquid B was added dropwise to the liquid A at −78° C. After completion of the dropwise addition, the mixture was stirred at room temperature for 3 hours.

(Step A2)

Next, TMEDA (3 ml) was added to the reaction solution, which was stirred at room temperature for 2 hours. After the reaction finished, an aqueous solution of 1 M hydrochloric acid was added to the reaction solution, and the mixture was extracted with hexane. The organic layer was thoroughly washed with an aqueous solution of 1 M hydrochloric acid, dehydrated with sodium sulfate, then filtered, and the solvent was removed from the filtrate under reduced pressure by an evaporator to obtain a residue.

The obtained residue was purified by flash column chromatography (SiO$_2$, Et$_2$O/Hexane, volume ratio 0:100-2:98) to obtain a yellow solid (0.95 mmol, 453 mg, 47%), which was then recrystallized to obtain a (R,R)-2,3-bisphosphinopyrazine derivative (2-1) (hereinafter referred to as "(R,R)-TMS-QuinoxP*").

(Identification Data of (R,R)-TMS-QuinoxP*)

$^1$H NMR (500 MHz, CDCl$_3$, δ): 0.45 (s, 18H), 0.97-1.02 (m, 18H), 1.46-1.51 (m, 6H), 7.87 (s, 2H). $^{13}$C NMR (125 MHz, CDCl$_3$, δ): 0.5, 4.6, 27.9, 32.4, 136.1, 143.4, 145.4, 162.3. $^{31}$P NMR (202 MHz, CDCl$_3$, δ): −12.1. HRMS-ESI (m/z): [M+H]+ calcd for C$_{24}$H$_{45}$N$_2$P$_2$Si$_2$, 479.25910. found, 479.25940. [α] D25° C. +116 (c 1.00, CDCl$_3$).

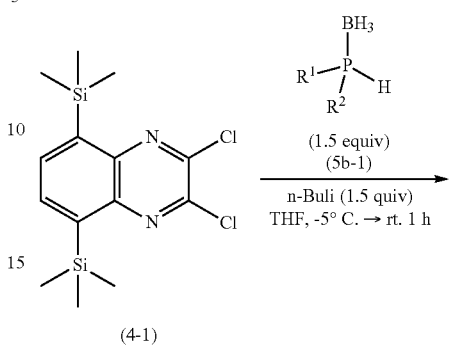

(4-1)

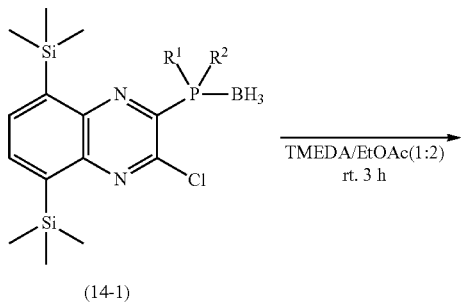

(14-1)

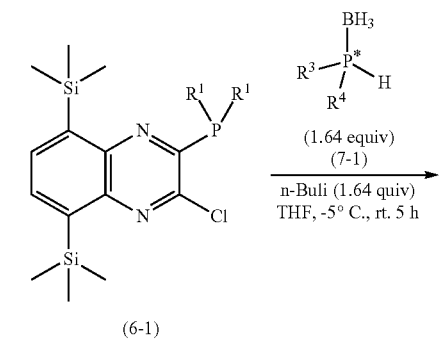

(6-1)

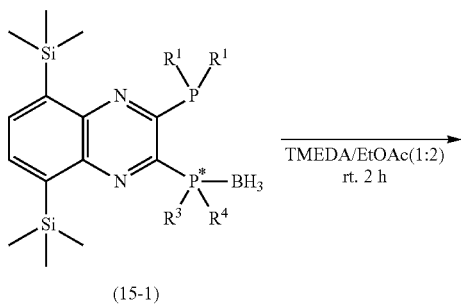

(15-1)

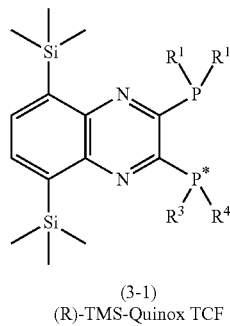

(3-1)
(R)-TMS-Quinox TCF

R¹ tert-Butyl
R³- tert-Butyl
R⁴-Me wherein R¹ represents a tert-butyl group, R³ represents a tert-butyl group, and R⁴ represents a methyl group.

<Step B1>

Phosphine-borane (5b-1) (5.6 mmol, 896 mg) was dissolved in THF (11 ml). To this solution, 3.4 ml of a solution of n-BuLi (1.64 M, 5.6 mmol) in hexane was added dropwise at −5° C. under a nitrogen atmosphere to obtain a liquid D.

The 2,3-dihalogenopyrazine derivative (4-1) (3.7 mmol, 1.27 mg) prepared above was dissolved in THF (14.8 ml) to obtain a liquid C.

The liquid D was added dropwise to the liquid C at −5° C. After completion of the dropwise addition, the mixture was stirred at room temperature for 1 hour. Water was added to the reaction solution to quench the reaction. Next, the organic layer was extracted with hexane three times, then dehydrated with sodium sulfate, and then filtered. The solvent was removed from the filtrate under reduced pressure by an evaporator to obtain an oily residue (phosphinopyrazine-borane derivative (14-1)).

<Step B2>

Next, TMEDA (3.7 ml) and ethyl acetate (7.4 ml) were added to the oily residue, and the mixture was stirred at room temperature for 3 hours. After the reaction finished, ethyl acetate was further added to the reaction solution, and the reaction solution was washed with an aqueous solution of 1 M hydrochloric acid. The reaction solution was further thoroughly washed with, in order, water and brine. Next, the organic layer was dehydrated with sodium sulfate, and then filtered. The solvent was removed from the filtrate under reduced pressure by an evaporator to obtain a residue.

The obtained residue was purified by flash column chromatography ($SiO_2$, $Et_2O$/Hexane, volume ratio 0:100-2:98). As a result, a red oily phosphinopyrazine derivative (6-1) (1.21 g, 2.66 mmol, 72%) was obtained.

<Step B3>

The S-optically active form of phosphine-borane (7-1) (4.26 mmol, 503 mg, >99% ee) was dissolved in THF (3.64 ml). To this solution, 2.6 ml of a solution of n-BuLi (1.64 M, 4.26 mmol) in hexane was added dropwise at 0° C. under a nitrogen atmosphere to obtain a liquid F.

14 ml of DMF was added to the phosphinopyrazine derivative (6-1) (2.6 mmol, 1.18 g) prepared above to obtain a liquid E.

The liquid F was added dropwise to the liquid E at −5° C., and the mixture was stirred for 5 hours. Water was added to the reaction solution to quench the reaction. Next, the organic layer was extracted with ethyl acetate two times, then washed with brine, dehydrated with sodium sulfate, and then filtered. The solvent was removed from the filtrate under reduced pressure by an evaporator to obtain an optically active phosphinopyrazine-borane derivative (15-1).

<Step B4>

Next, TMEDA (7 ml) and ethyl acetate (14 ml) were added to the optically active phosphinopyrazine-borane derivative (15-1), and the mixture was stirred at room temperature for 2 hours. After the reaction finished, ethyl acetate and an aqueous solution of 6 M hydrochloric acid were further added to the reaction solution, and the reaction solution was thoroughly washed. The organic layer was further thoroughly washed with water and brine. Next, the organic layer was dehydrated with sodium sulfate, and then filtered. The solvent was removed from the filtrate under reduced pressure by an evaporator to obtain a residue.

The obtained residue was purified by flash column chromatography ($SiO_2$, $Et_2O$/Hexane, volume ratio 0:100-2:98). Next, the residue was recrystallized from hexane:methanol (volume ratio 1:1) to obtain a (R)-2,3-bisphosphinopyrazine derivative (3-1) (hereinafter referred to as "(R)-TMS-QuinoxTCF") as a red solid (1.90 mmol, 992 mg, 73%).

(Identification Data of (R)-TMS-QuinoxTCF)

$^1$H NMR (500 MHz, $CDCl_3$, δ): 0.45 (d, J=0.45 Hz, 9H), 0.46 (d, J=0.46 Hz, 9H), 1.07 (d, J=11.5 Hz, 9H), 1.12 (d, J=10.9 Hz, 9H), 1.45 (d, J=6.3 Hz, 3H), 1.51 (d, J=12.0 Hz, 9H), 7.88 (d, J=6.6 Hz, 1H), 7.91 (d, J=6.6 Hz, 1H). $^{13}$C NMR (125 MHz, $CDCl_3$, δ): 0.04, 0.32, 5.7 (dd, $J_{cp}$=18.6 Hz, $J_{cp}$=11.3 Hz), 28.3 (d, $J_{cp}$=12.0 Hz), 30.4 (dd, $J_{cp}$=8.8 Hz, $J_{cp}$=3.3 Hz), 31.0 (d, $J_{cp}$=13.2 Hz), 32.4 (d, $J_{cp}$=16.8 Hz), 33.4 (dd, $J_{cp}$=23.3 Hz, $J_{cp}$=7.2 Hz), 36.4 (d, $J_{cp}$=22.8 Hz), 136.3, 136.8, 143.1, 143.9, 145.17, 145.29, 164.1 (d, $J_{cp}$=32.1 Hz), 164.3 (d, $J_{cp}$=32.1 Hz).

$^{31}$P NMR (202 MHz, $CDCl_3$, δ): −10.2, 24.9 (d, $J_{pp}$=108 Hz). HRMS-ESI (m/z): [M+H]+ calcd for $C_{27}H_{51}N_2P_2Si_2$, 521.30605. found, 521.30670. [α] D25° C. +23.5 (c 1.00, $CDCl_3$).

Example 3

An (S,S)-2,3-bisphosphinopyrazine derivative "(S,S)-TMS-QuinoxP*", which is an optically active form of the 2,3-bisphosphinopyrazine derivative represented by general formula (2), was obtained in the same manner as in Example 1, except that the R-optically active form of phosphine-borane in which R¹ is a tert-butyl group and R² is a methyl group was used as the phosphine-borane represented by formula (5a).

(Identification Data of (S,S)-TMS-QuinoxP*)

$^1$H NMR (500 MHz, $CDCl_3$, δ): 0.45 (s, 18H), 0.98-1.04 (m, 18H), 1.46-1.51 (m, 6H), 7.89 (s, 2H). $^{13}$C NMR (125 MHz, $CDCl_3$, δ): 0.5, 4.5, 27.9, 32.4, 136.2, 143.4, 145.4, 162.3. $^{31}$P NMR (202 MHz, $CDCl_3$, δ): −11.7. HRMS-ESI (m/z): [M+H]+ calcd for $C_{24}H_{45}N_2P_2Si_2$, 479.25910. found, 479.25930. [α]D25° C. −116 (c 1.00, $CDCl_3$).

Example 4

<Cis-Selective Asymmetric Boryl Cyclization Reaction Using E-Form Substrate>

CuCl (1.2 mg, 0.013 mmol), (R)-TMS-QuinoxTCF (6.5 mg, 0.013 mmol), and bispinacolatodiboron (76.2 mg, 0.3 mmol) were charged into a dried reaction vessel. The vessel was sealed with a septum coated with Teflon (registered trademark), and pressure reduction and nitrogen filling were repeated three times to turn the inside of the reaction vessel into a nitrogen atmosphere. Next, THF (0.4 mL) and a K(O-t-Bu) (potassium t-butoxide)/THF solution (1.0 mol/L, 0.6 mL, 0.6 mmol) were injected with a syringe, and the mixture was stirred at room temperature for 30 minutes. Then, the below allyl phosphate (82.1 mg, 0.25 mmol) was added dropwise as a substrate into the reaction solution using a syringe. After stirring at room temperature for 3 hours, the reaction solution was passed through a column (diameter: 10 mm, height: 30 mm) packed with a small amount of silica gel, and washed with diethyl ether. After removing the solvent using an evaporator, the obtained liquid was purified using flash column chromatography (SiO$_2$.Et$_2$O/hexane, volume ratio of 0:100 to 3:97) to produce the below target boryl cyclized form cis-1 as a colorless and transparent liquid (71.0 mg, 0.23 mmol) in a 94% yield, a cis/trans molar ratio of ≥95:5, and a cis-1/2 molar ratio of ≥95:5. The results are shown in Table 1. The optical purity of the cis-1 shown in Table 1 was determined by resolving all of the diastereomers including the cis-1 and trans-1 enantiomers by HPLC and calculating based on the measurements of HPLC obtained (amount of 1S2R form−amount of 1R2S form)/(amount of 1S2R form+amount of 1R2S form)×100.

During the reaction, it was confirmed by $^1$H, $^{13}$C, and $^{31}$P NMR that a metal complex in which (R)-TMS-QuinoxTCF was coordinated 1:1 with monovalent Cu ions was formed.

(Identification Data)

$^1$H NMR (400 MHz, CDCl$_3$, δ): 0.17 (dd, J=6.7, 9.0 Hz, 2H), 0.26 (s, 3H), 0.32 (s, 3H), 0.64 (td, J=7.0, 2.7 Hz, 1H), 1.05 (td, J=9.2, 2.7 Hz, 1H), 1.08 (s, 6H), 1.10 (s, 6H), 7.29-7.37 (m, 3H), 7.58-7.64 (m, 2H. $^{13}$C NMR (125 MHz, CDCl$_3$, δ): −2.8 (CH$_3$), −1.4 (CH$_3$), 2.8 (CH), 9.0 (CH$_2$), 24.5 (CH$_3$), 25.1 (CH$_3$), 82.9 (C), 127.5 (CH), 128.5 (CH), 133.8 (CH), 141.0 (C). HRMS-ESI (m/z): [M+Na]+ calcd for C$_{17}$H$_{27}$O$_2$BNaSi, 325.1769. found, 325.1766. [α]D22° C. −42 (c 1.05, CDCl$_3$).

[Formula 37]

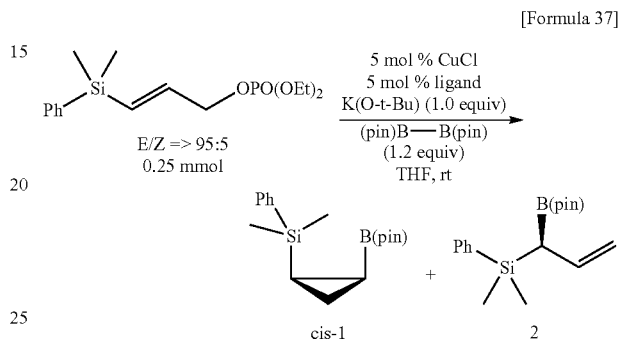

wherein Et is an ethyl group, Ph is a phenyl group, Bu is a butyl group, and B(pin) is a group represented by (9a).

Comparative Examples 1-6

The reaction was carried out in the same manner as in Example 4, except that the ligand was changed from (R)-TMS-QuinoxTCF to that shown in Table 1 below, and the reaction time was changed to that shown in Table 1 below. The cis-1 yield, the cis/trans molar ratio, the cis-1 optical purity, and the molar ratio of cis-1 to the below compound 2 are shown in Table 1 below.

TABLE 1

|  | Ligand | Time (h) | [a)] Cis-1 Yield (%) | [b)] Cis/Trans Molar Ratio | [c)] cis-1 Optical Purity (% ee) | [b)] cis-1/2 Molar Ratio |
|---|---|---|---|---|---|---|
| Example 4 | (R)-TMS-QuinoxTCF | 3 | 94 | >95:5 | 96 | >95:5 |
| Comparative Example 1 | (S)-QuinoxTCF | 3 | 93 | 93:7 | −90 | >95:5 |
| Comparative Example 2 | (R,R)-QuinoxP* | 2 | 82 | 90:10 | 84 | 86:14 |
| Comparative Example 3 | (R)-Segphos | 5 | 72 | 87:13 | −11 | 89:11 |
| Comparative Example 4 | (R)-DTBM-Segphos | 42 | 21 | 84:16 | 43 | 35:65 |
| Comparative Example 5 | (R,Sp)-Josiphos | 6 | 74 | 91:9 | 30 | 86:14 |
| Comparative Example 6 | (R,SpSp)-Mandyphos | 24 | 16 | 84:16 | 46 | 27:73 |

Note)
[a)] Determined by $^1$H NMR analysis.
[b)] Determined by GC analysis.
[c)] Determined by HPLC analysis.

The structures of the ligands in Table 1 are shown below.

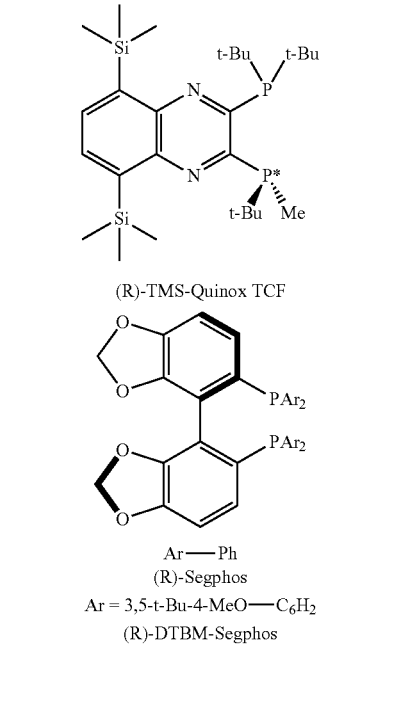

(R)-TMS-Quinox TCF (R)-Segphos
Ar = Ph
(R)-DTBM-Segphos
Ar = 3,5-t-Bu-4-MeO—C₆H₂

(R,Sp)-Josiphos

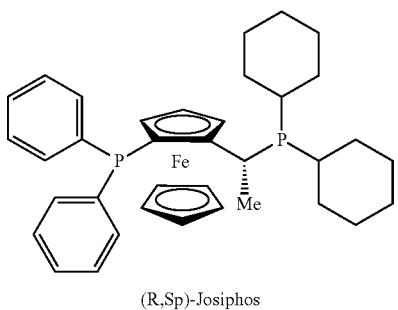

(R,SpSp)-Mandyphos

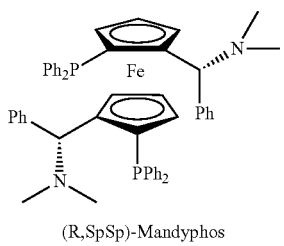

(S)-Quinox TCF

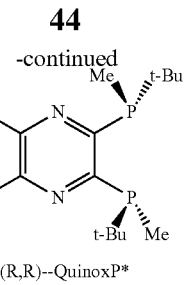

(R,R)-QuinoxP* wherein Ph represents a phenyl group, t-Bu represents a t-butyl group, and Me represents a methyl group.

Example 5

<Enantioselective γ-Position Boron Substitution Reaction>

CuCl (1.2 mg, 0.013 mmol), (R,R)-TMS-QuinoxP* (6.0 mg, 0.013 mmol), and bispinacolatodiboron (95.1 mg, 0.38 mmol) were charged into a dried reaction vessel. The vessel was sealed with a septum coated with Teflon (registered trademark), and pressure reduction and nitrogen filling were repeated three times to turn the inside of the reaction vessel into a nitrogen atmosphere. Next, THF (0.25 mL) and a K(O-t-Bu) (potassium t-butoxide)/THF solution (1.0 mol/L, 0.25 mL, 0.25 mmol) were injected with a syringe, the mixture was stirred at room temperature for 20 minutes, and then stirred at 0° C. for 15 minutes. Then, the below allyl carbonate (50.0 mg, 0.25 mmol) was added dropwise as a substrate to the reaction solution using a syringe. After stirring at 0° C. for 22 hours, the reaction solution was passed through a column (diameter: 10 mm, height: 30 mm) packed with a small amount of silica gel, and washed with diethyl ether. The solvent was removed by an evaporator, and the resultant product was purified using flash column chromatography (SiO₂.Et₂O/hexane, volume ratio of 0:100 to 4:96) to obtain the target allyl borate ester 3 as a colorless and transparent liquid in a 37% yield at 96% ee (23.1 mg, 0.092 mmol). The results are shown in Table 2.

During the reaction, it was confirmed by $^1$H, $^{13}$C, and $^{31}$P NMR that a metal complex in which (R,R)-TMS-QuinoxP* was coordinated 1:1 with monovalent Cu ions was formed.

(Identification Data)

$^1$H NMR (400 MHz, CDCl₃, δ): 0.87 (t, J=7.0 Hz, 3H), 1.12-1.47 (m, 21H), 1.49-1.59 (m, 1H), 1.82 (dt, J=7.6, 15.7 Hz, 1H), 4.89-5.01 (m, 2H), 5.78 (ddt, J=7.9, 9.1, 18.2 Hz, 1H). $^{13}$C NMR (125 MHz, CDCl₃, δ): 14.1 (CH₃), 22.6 (CH₂), 24.6 (CH₃), 24.7 (CH₃), 29.0 (CH₂), 29.3 (CH₂), 30.2 (CH₂), 31.8 (CH₂), 83.1 (C), 113.3 (CH₂), 139.8 (CH). HRMS-ESI (m/z): [M+]+ calcd for C₁₅H₂₉O₂B, 252.2263. found, 252.2262. [α] D22° C. +0.2 (c 0.98, CDCl₃).

Comparative Example 7, Reference Example 1

The reaction was carried out in the same manner as in Example 5, except that the ligand was changed to that shown in Table 2 below. The optical purity of the obtained Compound 3 is shown in Table 2 below.

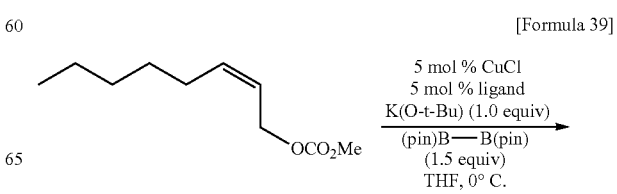

5 mol % CuCl
5 mol % ligand
K(O-t-Bu) (1.0 equiv)
(pin)B—B(pin) (1.5 equiv)
THF, 0° C.

-continued

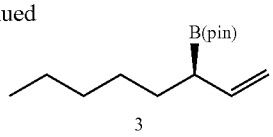

wherein Me is a methyl group and B(pin) is a group represented by (9a).

TABLE 2

| | Ligand | Optical Purity (% ee) of 3 |
|---|---|---|
| Example 5 | (R,R)-TMS-QuinoxP* | 96 |
| Comparative Example 7 | (R,R)-QuinoxP* | 83 |
| Reference Example 1 | (S,S)-BenzP* | −97 |

The structures of the ligands in Table 2 are shown below.

[Formula 40]

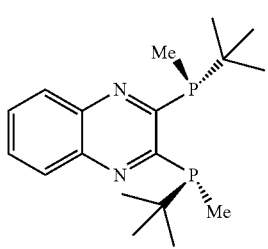 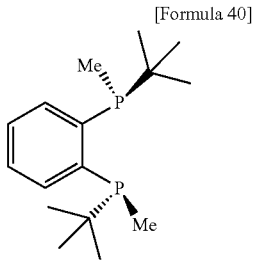

(R,R)-QuinoxP*         (S,S)-BenzP*

Examples 6-1 to 6-7

<Asymmetric Hydrogenation Reaction Using (R,R)-TMS-QuinoxP*/Rhodium Complex>

A 50 mL pressure-resistant reaction tube was charged with 0.5 mmol of the substrate represented by the following formula (I). The reaction tube was connected to a hydrogen gas tank by a stainless steel tube. The reaction tube was purged five times with hydrogen gas, and then filled with hydrogen gas (99.99999%, manufactured by Japan Fine Products) at 1 atm. To another 20 mL flask purged with argon, 1.87 mg (0.005 mmol) of bis[η-(2,5-norbornadiene)]rhodium(I) tetrafluoroborate ([Rh(nbd)$_2$]BF$_4$), 2.87 mg (0.006 mmol) of (R,R)-TMS-QuinoxP*, and 3 mL of degassed methanol were added, and the mixture was stirred for 30 minutes to obtain a catalyst preparation solution. Using a syringe, 3 mL of the catalyst preparation solution was added from the 20 mL flask to the 50 mL pressure-resistant reaction tube. Next, the pressure of the hydrogen gas in the reaction tube was set to 3 atm. After carrying out a hydrogenation reaction by stirring for the reaction time shown in Table 3, the hydrogen remaining in the reaction tube was released, and the reaction solution was concentrated by an evaporator to obtain a residue. The residue was purified by flash chromatography (SiO$_2$, ethyl acetate/hexane, 3:1) to obtain the product represented by formula (II). The absolute configuration and ee value of the product were determined based on a comparison with the retention time and previously reported values.

During the reaction, it was confirmed by $^1$H, $^{13}$C, and $^{31}$P NMR measurement that a metal complex in which (R,R)-TMS-QuinoxP* was coordinated 1:1 with monovalent rhodium ions was formed.

[Formula 41]

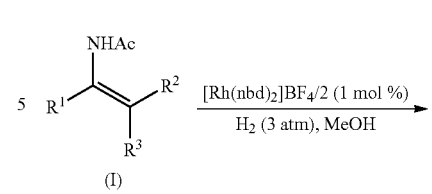

(Ac represents an acetyl group)

TABLE 3

| | Compounds of Formulas (I) and (II) | | | | ee (%) |
|---|---|---|---|---|---|
| Example | Type of R$^1$ | Type of R$^2$ | Type of R$^3$ | Reaction Time | (configuration) |
| 6-1 | CO$_2$Me | Ph | H | 2 hours | 99.9 (S) |
| 6-2 | Me | H | CO$_2$Me | 2 hours | 97.8 (R) |
| 6-3 | Me | CO$_2$Me | H | 12 hours | 99.0 (R) |
| 6-4 | Ph | CO$_2$Me | H | 2 hours | 98.6 (S) |
| 6-5 | 1-naphthyl | H | H | 2 hours | 85.0 (S) |
| 6-6 | 3-AcOPh— | H | H | 2 hours | 98.0 (S) |
| 6-7 | Me | PhCO— | H | 12 hours | 83.0 (R) |

(In the formula, Me is a methyl group, Ph is a phenyl group, and Ac is an acetyl group.)

Example 7

<Asymmetric Hydrogenation Reaction Using (R,R)-TMS-QuinoxP*/Rhodium Complex>

A 50 mL pressure-resistant reaction tube was charged with 0.5 mmol of the substrate represented by the following formula (I) and 2 mL of degassed methanol. The reaction tube was connected to a hydrogen gas tank by a stainless steel tube. The reaction tube was purged five times with hydrogen gas, and then filled with hydrogen gas (99.99999%, manufactured by Japan Fine Products) at 1 atm. To another 20 mL flask purged with argon, 1.87 mg (0.005 mmol) of [Rh(nbd)$_2$]BF$_4$, 2.87 mg (0.006 mmol) of (R,R)-TMS-QuinoxP*, and 10 mL of degassed methanol were added, and the mixture was stirred for 30 minutes to obtain a catalyst preparation solution. Using a syringe, 1 mL of the catalyst preparation solution was added from the 20 mL flask to the 50 mL pressure-resistant reaction tube. Next, the pressure of the hydrogen gas in the reaction tube was set to 3 atm. After carrying out a hydrogenation reaction by stirring for 2 hours, the hydrogen remaining in the reaction tube was released, and the reaction solution was concentrated by an evaporator to obtain a residue. The residue was purified by flash chromatography (SiO$_2$, ethyl acetate/hexane, volume ratio 3:1) to obtain the product represented by the following formula (II). The absolute configuration and ee value of the product were determined based on a comparison with the retention time and previously reported values.

During the reaction, it was confirmed by $^1$H, $^{13}$C, and $^{31}$P NMR measurement that a metal complex in which (R,R)-TMS-QuinoxP* was coordinated 1:1 with monovalent rhodium ions was formed.

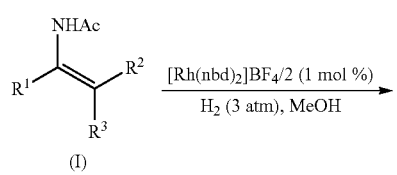

(Ac represents an acetyl group)

TABLE 4

| Example | Compounds of Formulas (I) and (II) | | | | ee (%) (configuration) |
|---|---|---|---|---|---|
| | Type of $R^1$ | Type of $R^2$ | Type of $R^3$ | Reaction Time | |
| 7 | $CO_2Me$ | Ph | H | 2 hours | 99.9 (S) |

(In the formula, Me is a methyl group and Ph is a phenyl group.)

Examples 8-1 to 8-4

<Asymmetric Hydrogenation Reaction Using (S,S)-TMS-QuinoxP*/Rhodium Complex>

The reaction was carried out in the same manner as in Examples 6-1 to 6-7, except that (S,S)-TMS-QuinoxTCF was used instead of (R,R)-TMS-QuinoxP*. The results are shown in Table 5. During the reaction, it was confirmed by $^1H$, $^{13}C$, and $^{31}P$ NMR measurement that a metal complex in which (S,S)-TMS-QuinoxP* was coordinated 1:1 with monovalent rhodium ions was formed.

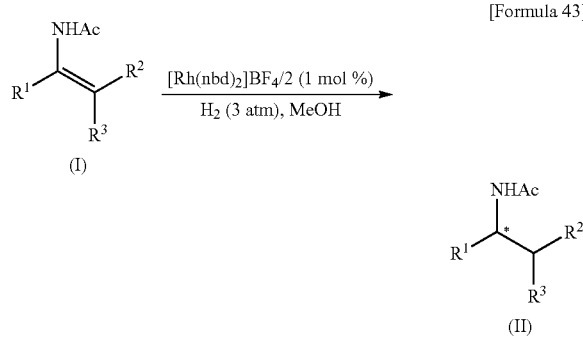

(Ac represents an acetyl group)

TABLE 5

| Example | Compounds of Formulas (I) and (II) | | | | ee (%) (configuration) |
|---|---|---|---|---|---|
| | Type of $R^1$ | Type of $R^2$ | Type of $R^3$ | Reaction Time | |
| 8-1 | $CO_2Me$ | Ph | H | 2 hours | 99.9 (R) |
| 8-2 | Me | H | $CO_2Me$ | 2 hours | 94.5 (S) |
| 8-3 | 3-AcOPh— | H | H | 2 hours | 98.7 (S) |
| 8-4 | Me | PhCO— | H | 12 hours | 83.4 (S) |

(In the formula, Me is a methyl group, Ph is a phenyl group, and Ac is an acetyl group.)

Examples 9-1 to 9-3

<Asymmetric Hydrogenation Reaction Using (R)-TMS-QuinoxTCF/Rhodium Complex>

The reaction was carried out in the same manner as in Examples 6-1 to 6-7, except that (R)-TMS-QuinoxTCF was used instead of (R,R)-TMS-QuinoxP*. The results are shown in Table 6. During the reaction, it was confirmed by $^1H$, $^{13}C$, and $^{31}P$ NMR measurement that a metal complex in which (R)-TMS-QuinoxTCF was coordinated 1:1 with monovalent rhodium ions was formed.

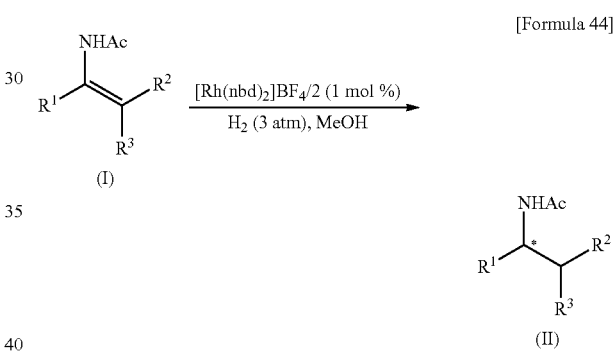

(Ac Represents an Acetyl Group)

TABLE 6

| Example | Compounds of Formulas (I) and (II) | | | | ee (%) (configuration) |
|---|---|---|---|---|---|
| | Type of $R^1$ | Type of $R^2$ | Type of $R^3$ | Reaction Time | |
| 9-1 | $CO_2Me$ | Ph | H | 2 hours | 99.6 (S) |
| 9-2 | Me | H | $CO_2Me$ | 2 hours | 88.3 (R) |
| 9-3 | 3-AcOPh— | H | H | 2 hours | 89.7 (R) |

(In the formula, Me is a methyl group, Ph is a phenyl group, and Ac is an acetyl group.)

Example 10

The reaction and purification were carried out in the same manner as in Example 2, except that the 2,3-dihalogenopyrazine derivative represented by the following general formula (4-2) was used instead of the 2,3-dihalogenopyrazine derivative (4-1), to obtain a (R)-2,3-bisphosphinopyrazine derivative represented by the following general formula (3-2) (hereinafter, referred to as "(R)-TES-QuinoxTCF").

[Formula 45]

(4-2)

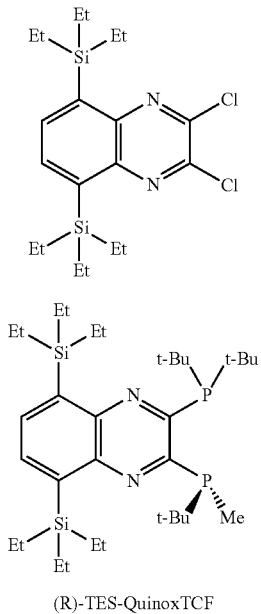

(3-2)

(R)-TES-QuinoxTCF (Identification Data of (R)-TES-QuinoxTCF)
$^1$H NMR (400 MHz, CDCl$_3$, δ): 0.83-0.98 (m, 12H), 0.92 (d, J=5.8 Hz, 9H), 0.99-1.14 (m, 18H), 1.02 (d, J=11.2 Hz, 9H), 1.44 (d, J=6.7 Hz, 3H), 1.50 (d, J=12.1 Hz, 9H), 7.81 (d, J=6.7 Hz, 1H), 7.84 (d, J=6.7 Hz, 1H). $^{13}$C NMR (100 MHz, CDCl$_3$, δ): 3.7 (CH$_2$), 3.9 (CH$_2$), 5.4 (dd, J=11.9, 18.6 Hz, CH$_3$), 7.6 (CH$_3$), 7.7 (CH$_3$), 28.1 (d, J=12.4 Hz, CH$_3$), 30.3 (dd, J=2.9, 11.4 Hz, CH$_3$), 30.9 (d, J=14.3 Hz, CH$_3$), 32.2 (d, J=17.2 Hz, C), 33.1 (dd, J=8.1, 25.3 Hz, C), 36.2 (d, J=24.8 Hz, C), 137.2 (CH), 137.7 (CH), 139.8 (C), 140.6 (C), 145.2 (C), 145.5 (C), 163.6 (dd, J=27.7, 37.2 Hz, C), 164.3 (dd, J=30.0, 34.8 Hz, C). $^{31}$P NMR (160 MHz, CDCl$_3$, δ): −10.8 (d, J=124.7 Hz), 24.7 (d, J=128.9 Hz). HRMS-ESI (m/z): [M+H]+ calcd for C$_{33}$H$_{63}$N$_2$P$_2$Si$_2$, 605.39995. found, 605.40137. [α]$_D^{21.4}$+170.5 (c 1.0, EtOAc). mp=132° C.

Example 11

The reaction and purification were carried out in the same manner as in Example 2, except that the 2,3-dihalogenopyrazine derivative represented by the following general formula (4-3) was used instead of the 2,3-dihalogenopyrazine derivative (4-1), to obtain a (R)-2,3-bisphosphinopyrazine derivative represented by the following general formula (3-3) (hereinafter, referred to as "(R)-DMPS-QuinoxTCF").

[Formula 46]

(4-3)

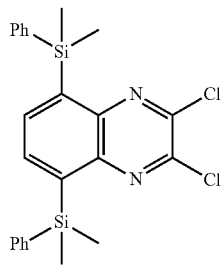

(3-3)

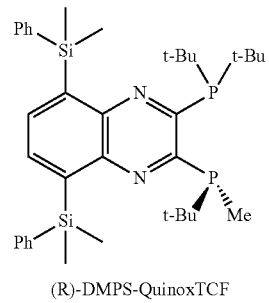

(R)-DMPS-QuinoxTCF (Identification Data of (R)-DMPS-Quinox TCF)
$^1$H NMR (400 MHz, CDCl$_3$, δ): 0.69 (s, 3H), 0.71 (s, 3H), 0.73 (s, 3H), 0.75 (s, 3H), 0.89 (d, J=11.2 Hz, 9H), 0.95 (d, J=10.3 Hz, 9H), 1.18 (d, J=6.7 Hz, 3H), 1.30 (d, J=11.7 Hz, 9H), 7.27-7.38 (m, 6H), 7.46-7.53 (m, 4H), 7.63 (d, J=6.7 Hz, 1H), 7.67 (d, J=6.7 Hz, 1H). $^{13}$C NMR (100 MHz, CDCl$_3$, δ): −1.5 (CH$_3$), −1.2 (CH$_3$), −0.93 (CH$_3$), −0.57 (CH$_3$), 5.2 (dd, J=11.9, 18.6 Hz, CH$_3$), 28.1 (d, J=12.4 Hz, CH$_3$), 30.3 (dd, J=3.8, 11.5 Hz, CH$_3$), 30.9 (d, J=15.3 Hz, CH$_3$), 32.1 (d, J=17.2 Hz, C), 33.0 (dd, J=8.6, 24.8 Hz, C), 36.2 (d, J=24.8 Hz, C), 127.7 (CH), 128.8 (CH), 128.9 (CH), 134.2 (CH), 134.4 (CH), 137.7 (CH), 138.5 (CH), 138.7 (C), 138.9 (C), 141.3 (C), 142.3 (C), 145.0 (C), 145.3 (C), 164.4 (dd, J=29.1, 36.7 Hz, C), 165.2 (dd, J=29.6, 35.3 Hz, C). $^{31}$P NMR (160 MHz, CDCl$_3$, δ): −10.0 (d, J=124.7 Hz), 24.6 (d, J=120.4 Hz). HRMS-ESI (m/z): [M+H]+ calcd for C$_{37}$H$_{55}$N$_2$P$_2$Si$_2$, 645.33735. found, 645.33870. [α]$_D^{22.0}$+125.8 (c 1.0, EtOAc). mp=167° C.

Example 12

[Formula 47]

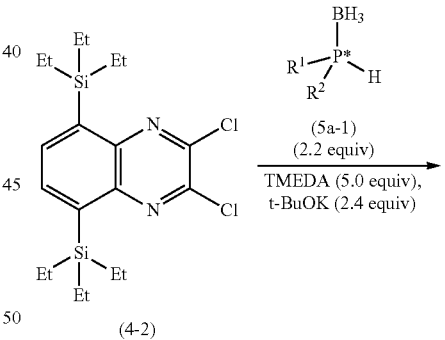

R$^1$ = tert-Butyl
R$^2$ = Me

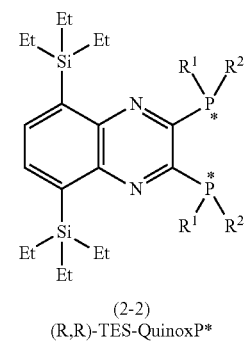

(2-2)
(R,R)-TES-QuinoxP*

The 2,3-dihalogenopyrazine derivative (4-2) (855 mg, 2 mmol) and (S)-t-butylmethylphosphine borane (5a-1) (519 mg, 4.4 mmol) were charged into a 30 mL two-necked flask equipped with a three-way cock provided with an argon balloon and a septum, and the system was purged with argon. Degassed THF (4 mL) and N,N,N',N'-tetramethylethylenediamine (1.49 mL, 10 mmol) were added via the septum with a syringe. The flask was immersed in a −20° C. low-temperature bath, and a solution of potassium-tert-butoxide in 1.0 M THF (4.8 mL, 4.8 mmol) was added dropwise with a syringe over 10 minutes while stirring with a magnetic stirrer. After the dropwise addition, the temperature was raised to room temperature over about 1.5 hours, and stirring was continued. As a result, a yellow-orange crystalline precipitate was deposited. After stirring for one day and night, the flask was immersed in an ice bath, water (5 mL) and 2M HCl (8.6 mL, 17.2 mmol) were added, and the mixture was stirred for 15 minutes. The crystalline precipitate was collected by filtration on a glass filter, washed with water and methanol, and then dried in vacuum, whereby 995 mg (88% yield) of the target compound was obtained as a yellow-orange powder.

(Identification Data of (R,R)-TES-QuinoxP*)

$^1$H NMR (500 MHz, CDCl$_3$, δ): 0.92 (t, J=7.5 Hz, 18H), 0.93-0.97 (m, 18H), 0.96-1.13 (m, 12H), 1.45-1.48 (m, 6H), 7.81 (s, 2H). $^{13}$C NMR (125 MHz, CDCl$_3$, δ): 3.9, 4.5, 7.7, 27.8, 32.3, 137.1, 140.2, 145.6, 162.2 (d, J$_{cp}$=6.0 Hz). $^{31}$P NMR (202 MHz, CDCl$_3$, δ): −12.2. mp 174-175° C. (recry. From AcOEt).

$[\alpha]_D^{28}$=+185 (c 1.00, CDCl$_3$).

Example 13

[Formula 48]

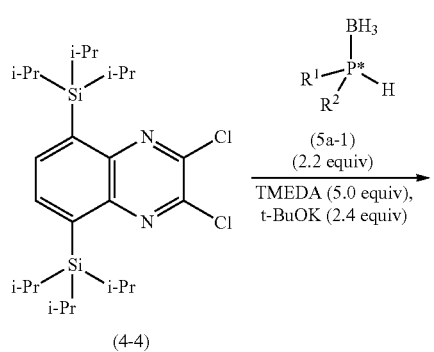

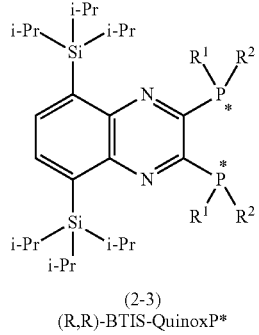

(2-3)
(R,R)-BTIS-QuinoxP*

$R^1$ = tert-Butyl
$R^2$ = Me

The 2,3-dihalogenopyrazine derivative (4-4) (358 mg, 0.7 mmol) and (S)-t-butylmethylphosphine borane (5a-1) (182 mg, 1.54 mmol) were charged into a 30 mL two-necked flask equipped with a three-way cock provided with an argon balloon and a septum, and the system was purged with argon. Degassed THF (1.4 mL) and N,N,N',N'-tetramethylethylenediamine (0.52 mL, 3.5 mmol) were added via the septum with a syringe. The flask was immersed in a −20° C. low-temperature bath, and a solution of potassium tert-butoxide in 1.0 M THF (1.7 mL, 1.7 mmol) was added dropwise with a syringe over 10 minutes while stirring with a magnetic stirrer. After the dropwise addition, the temperature was raised to room temperature over about 1.5 hours, the mixture was stirred for one day and night. Then, a flask containing the deposited yellow-orange crystalline precipitate was immersed in an ice bath, water (2 mL) and 2M HCl (4 mL, 8 mmol) were added, and the mixture was stirred for 15 minutes. The crystalline precipitate was collected by filtration on a glass filter, washed with water, methanol, and ethyl acetate, and then dried in vacuum, whereby 276 mg (61% yield) of the target compound was obtained as a yellow powder.

(Identification Data of (R,R)-BTIS-QuinoxP*)

$^1$H NMR (500 MHz, CDCl$_3$, δ): 0.84-87 (m, 9H), 1.08 (d, J=8.0 Hz, 9H), 1.17 (d, J=7.3 Hz, 9H), 1.41-1.45 (m, 6H), 1.86 (sep, J=7.7 Hz, 6H), 7.87 (s, 2H).

$^{13}$C NMR (125 MHz, CDCl$_3$, δ): 4.1, 12.9, 19.4 (d, J$_{cp}$=21.4 Hz), 27.4, 32.3, 137.5, 138.9, 145.7, 160.6 (d, J$_{cp}$=7.2 Hz).

$^{31}$P NMR (202 MHz, CDCl$_3$, δ): −10.6. mp 209-211° C. (decomp). $[\alpha]_D^{28}$=+346 (c 1.02, Hexane).

Examples 14-1 to 14-2

<Cis-Selective Asymmetric Boryl Cyclization Reaction Using E-Form Substrate>

The reaction was carried out in the same manner as in Example 4, except that the ligand was changed from (R)-TMS-QuinoxTCF to that shown in Table 7 below. The cis-1 yield, the cis/trans molar ratio, the cis-1 optical purity, and the molar ratio of cis-1 to the above compound 2 are shown in Table 7 below.

TABLE 7

| Example | Ligand | Time (h) | a) Cis-1 Yield (%) | b) Cis/Trans Molar Ratio | c) Cis-1 Optical Purity (% ee) | b) cis-1/2 Molar Ratio |
|---|---|---|---|---|---|---|
| 14-1 | (R)-TES-QuinoxTCF | 3 | 97 | 97:3 | 96 | >99:1 |
| 14-2 | (R)-DMPS-QuinoxTCF | 3 | 98 | >99:1 | 96 | 99:1 |

Note)
a) Determined by $^1$H NMR analysis.
b) Determined by GC analysis.
c) Determined by HPLC analysis.

Examples 15-1 to 15-7

<Cis-Selective Asymmetric Boryl Cyclization Reaction Using E-Form Substrate>

The reaction was carried out in the same manner as in Example 4, except that the ligand was (R)-DMPS-QuinoxTCF and the allyl phosphate serving as the substrate was changed to that shown in Table 8 below. The cis-1 yield, the cis/trans molar ratio, the cis-1 optical purity, and the molar ratio of cis-1 to the below compound 2 are shown in Table 8 below.

[Formula 49]

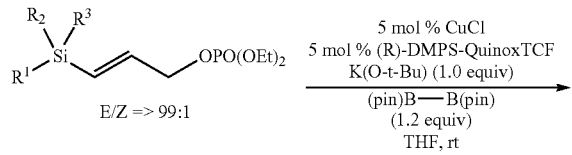

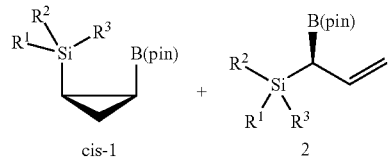

wherein $R^1$, $R^2$, and $R^3$ are the groups listed in Table 8, Et is an ethyl group, Ph is a phenyl group, Bu is a butyl group, and B(pin) is a group represented by (9a).

TABLE 8

| | In Formula | | | | a) Cis-1 | b) Cis/Trans | c) Cis-1 Optical | b) cis-1/2 |
|---|---|---|---|---|---|---|---|---|
| Example | Type of $R^1$ | Type of $R^2$ | Type of $R^3$ | Time (h) | Yield (%) | Molar Ratio | Purity (% ee) | Molar Ratio |
| 15-1 | Me | Me | Ph | 3 | 97 | >99:1 | 96 | 99:1 |
| 15-2 | Me | Ph | Ph | 3 | 97 | >99:1 | 97 | >99:1 |
| 15-3 | Ph | Ph | Ph | 3 | 82 | >99:1 | 80 | 91:9 |
| 15-4 | Me | Me | Me | 3 | 85 | 96:4 | 89 | 90:10 |
| 15-5 | t-Bu | Me | Me | 3 | 82 | 92:8 | 87 | 88:12 |
| 15-6 | Me | Me | CH$_2$Ph | 3 | 73 | 97:3 | 86 | 78:22 |
| 15-7 | t-Bu | Ph | Ph | 3 | 42 | 94:4 | 81 | 52:48 |

Note)
a) Determined by $^1$H NMR analysis.
b) Determined by GC analysis.
c) Determined by HPLC analysis.

Examples 16-1 to 16-3

The reaction was carried out in the same manner as in Example 15, except that the substrate was changed to that shown in Table 9 below. The cis-1 yield, the cis/trans molar ratio, the cis-1 optical purity, and the molar ratio of cis-1 to the below compound 2 are shown in Table 9 below.

[Formula 50]

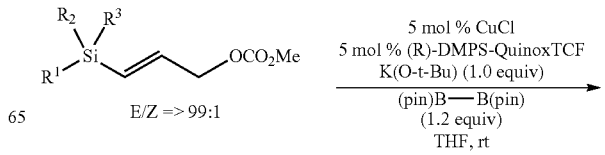

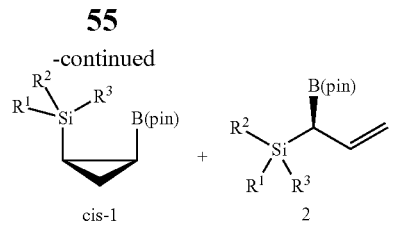

wherein R¹, R², and R³ are the groups listed in Table 9, Et is an ethyl group, Ph is a phenyl group, Bu is a butyl group, and B(pin) is a group represented by (9a).

TABLE 9

| Example | In Formula R¹ | R² | R³ | Time (h) | a) Cis-1 Yield (%) | b) Cis/Trans Molar Ratio | c) Cis-1 Optical Purity (% ee) | b) cis-1/2 Molar Ratio |
|---|---|---|---|---|---|---|---|---|
| 16-1 | Me | Me | Ph | 3 | 67 | 97:3 | 98 | >99:1 |
| 16-2 | Me | Me | Me | 3 | 70 | 96:4 | 97 | >99:1 |
| 16-3 | Me | Me | CH₂Ph | 3 | 66 | 96:4 | 98 | >99:1 |

Note)
a) Determined by ¹H NMR analysis.
b) Determined by GC analysis.
c) Determined by HPLC analysis.

Examples 17-1 to 17-6

<Enantioselective γ-Position Boron Substitution Reaction>

The reaction was carried out in the same manner as in Example 5, except that the ligand was (R,R)-TMS-QuinoxP*, the allyl carbonate serving as the substrate was changed to that shown in Table 10 below, and the reaction temperature was set to 50° C. The optical purity of the obtained below compound 3 is shown in Table 10 below.

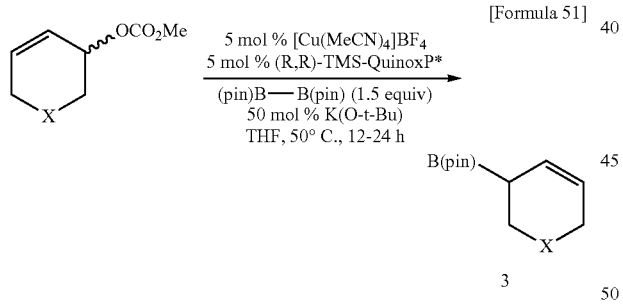

[Formula 51]

wherein X is the group shown in Table 10.

TABLE 10

| Example | X in Formula | a) Yield (%) | b) Optical Purity (% ee) |
|---|---|---|---|
| 17-1 | C | 94 | 95 |
| 17-2 | C(CH₃)₂ | 73 | 84 |
| 17-3 | N-Ts | 85 | 95 |
| 17-4 | N-Boc | 90 | 94 |
| 17-5 | O | 92 | 96 |
| 17-6 | N-Cbz | 84 | 90 |

Note)
a) Determined by ¹H NMR analysis.
b) Determined by HPLC analysis. N-Ts represents 4-CH₃—C₆H₄SO₂—N, N-Boc represents t-BuOCO—N, and N-Cbz represents PhCH₂OCO—N.

INDUSTRIAL APPLICABILITY

According to the present invention, a novel 2,3-bisphosphinopyrazine derivative useful as a ligand of an asymmetric catalyst, a transition metal complex including the novel 2,3-bisphosphinopyrazine derivative as a ligand, and an asymmetric catalyst using this transition metal complex can be provided. Further, according to the production method of the present invention, the optically active 2,3-bisphosphinopyrazine derivative of the present invention can be easily produced. In addition, an asymmetric catalyst using a transition metal complex, in particular an asymmetric catalyst using a transition metal complex with copper metal, having the optically active 2,3-bisphosphinopyrazine derivative of the present invention as a ligand has a high enantioselectivity and reaction activity in a cis-selective asymmetric boryl cyclization reaction or an enantioselective γ-position boron substitution reaction using an E-form substrate.

Further, when an asymmetric hydrogenation reaction is carried out using, as a catalyst, a transition metal complex having the optically active 2,3-bisphosphinopyrazine derivative of the present invention as a ligand, high optical purity and a high chemical yield due to the transition metal complex can be realized.

The invention claimed is:
1. A 2,3-bisphosphinopyrazine represented by the following general formula (1):

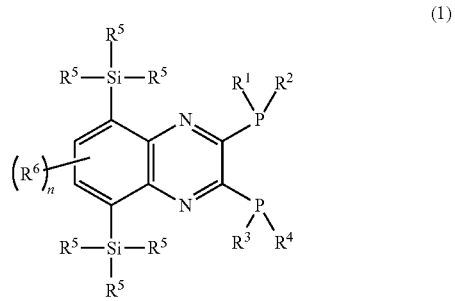

(1)

wherein R¹, R², R³, and R⁴ represent an optionally substituted straight-chain or branched alkyl group having 1 to 10 carbon atoms, an optionally substituted cycloalkyl group, an optionally substituted adamantyl group, or an optionally substituted phenyl group, R⁵ represents an optionally substituted alkyl group having 1 to 10 carbon atoms or an optionally substituted phenyl group, each R⁵ is optionally the same group or a different group, R⁶ represents a monovalent substituent, and n denotes an integer of 0 to 2.

2. An optically active form of the 2,3-bisphosphinopyrazine represented by general formula (1) according to claim 1, wherein at least one of $R^1$, $R^2$, $R^3$ and $R^4$ are not the same.

3. The optically active form of the 2,3-bisphosphinopyrazine according to claim 2, wherein $R^1$ and $R^2$ in the formula of general formula (1) are a combination of groups of any of the following (i) to (iii):

(i) $R^1$ and $R^2$ are a combination of a tert-butyl group and a methyl group;

(ii) $R^1$ and $R^2$ are a combination of an adamantyl group and a methyl group;

(iii) $R^1$ and $R^2$ are a combination of a 1,1,3,3-tetramethylbutyl group and a methyl group.

4. The optically active form of the 2,3-bisphosphinopyrazine according to claim 2, wherein $R^1$, $R^3$, and $R^4$ in the formula of general formula (1) are a combination of groups of any of the following (1) to (9):

(1) $R^1$ is a tert-butyl group, and $R^3$ and $R^4$ are a combination of a tert-butyl group and a methyl group;

(2) $R^1$ is a tert-butyl group, and $R^3$ and $R^4$ are a combination of a 1,1,3,3-tetramethylbutyl group and a methyl group;

(3) $R^1$ is a tert-butyl group, and $R^3$ and $R^4$ are a combination of an adamantyl group and a methyl group;

(4) $R^1$ is an adamantyl group, and $R^3$ and $R^4$ are a combination of a tert-butyl group and a methyl group;

(5) $R^1$ is an adamantyl group, and $R^3$ and $R^4$ are a combination of a 1,1,3,3-tetramethylbutyl group and a methyl group;

(6) $R^1$ is an adamantyl group, and $R^3$ and $R^4$ are a combination of an adamantyl group and a methyl group;

(7) $R^1$ is a 1,1,3,3-tetramethylbutyl group, and $R^3$ and $R^4$ are a combination of a tert-butyl group and a methyl group;

(8) $R^1$ is a 1,1,3,3-tetramethylbutyl group, and $R^3$ and $R^4$ are a combination of a 1,1,3,3-tetramethylbutyl group and a methyl group;

(9) $R^1$ is a 1,1,3,3-tetramethylbutyl group, and $R^3$ and $R^4$ are a combination of an adamantyl group and a methyl group.

5. A method for producing an optically active form of the 2,3-bisphosphinopyrazine according to claim 2, the method comprising:

reacting a deprotonated product of an optically active phosphine-borane represented by the following general formula (5a),

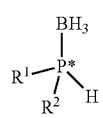

(5a)

wherein $R^1$ and $R^2$ have the same meanings as in general formula (1), $R^1$ and $R^2$ are not the same group, and * represents an asymmetric center on the phosphorus atom with a 2,3-dihalogenopyrazine represented by the following general formula (4),

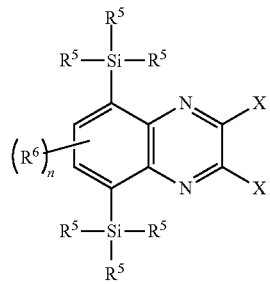

(4)

wherein $R^5$, $R^6$, and n have the same meanings as in general formula (1), and X represents a halogen atom to perform a nucleophilic substitution reaction; and then performing a deboranation reaction to produce the optically active form of the 2,3-bisphosphinopyrazine derivative.

6. A method for producing an optically active form of the 2,3-bisphosphinopyrazine according to claim 2, comprising mixing: a liquid comprising a 2,3-dihalogenopyrazine represented by the following general formula (4),

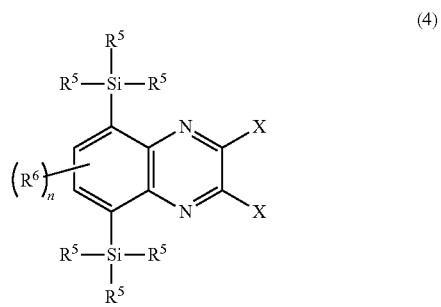

(4)

wherein $R^5$, $R^6$, and n have the same meanings as in general formula (1), and X represents a halogen atom;

an optically active phosphine-borane represented by the following general formula (5a),

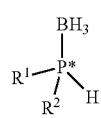

(5a)

wherein $R^1$ and $R^2$ have the same meanings as in general formula (1), $R^1$ and $R^2$ are not the same group, and * represents an asymmetric center on the phosphorus atom; and a deboranation agent with a base to perform a reaction.

7. A method for producing the 2,3-bisphosphinopyrazine represented by the general formula (1) according to claim 2 wherein $R^1$ and $R^2$ are the same, the method comprising:

reacting a deprotonated product of a phosphine-borane represented by the following general formula (5b),

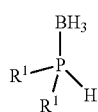

(5b)

with an optically active 2,3-dihalogenopyrazine represented by the following general formula (4),

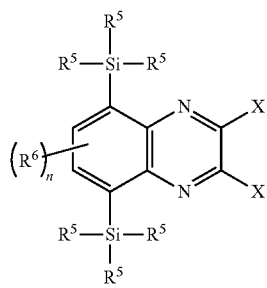

(4)

to perform a first nucleophilic substitution reaction, followed by performing a first deboranation reaction to obtain a phosphinopyrazine represented by the following general formula (6),

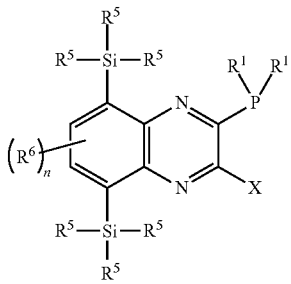

(6)

then reacting a deprotonated product of an optically active phosphine-borane represented by the following general formula (7), $$\underset{R^4}{\overset{R^3}{\diagdown}}\underset{H}{\overset{BH_3}{\underset{|}{P^*}}} \qquad (7)$$

with the phosphinopyrazine represented by general formula (6) to performing a second nucleophilic substitution reaction, and followed by performing a second deboranation reaction to obtain the 2,3-bisphosphinopyrazine according to claim 2, wherein the $R^1$, $R^3$, $R^4$, $R^5$, $R^6$ and * have the same meanings as in general formula (1), X represents a halogen atom.

8. A transition metal complex comprising the 2,3-bisphosphinopyrazine according to claim 1 as a ligand.

9. A transition metal complex comprising the 2,3-bisphosphinopyrazine according to claim 2 as a ligand.

10. The transition metal complex according to claim 9, which is a copper metal complex or a rhodium metal complex.

11. An asymmetric catalyst comprising the transition metal complex according to claim 9.

12. The asymmetric catalyst according to claim 11, wherein the transition metal complex is a copper metal complex.

13. The asymmetric catalyst according to claim 11, which is used in an asymmetric hydrogenation reaction.

* * * * *